United States Patent [19]

Every et al.

[11] Patent Number: 4,673,226

[45] Date of Patent: Jun. 16, 1987

[54] VEHICLE SKID CONTROL SYSTEM

[75] Inventors: Peter Every, Livonia; Thomas M. Atkins; Roger L. Miller, both of Ann Arbor, all of Mich.; Leonard T. Tribe, Seal Beach, Calif.

[73] Assignee: Kelsey-Hayes Company, Romulus, Mich.

[21] Appl. No.: 702,765

[22] Filed: Feb. 19, 1985

[51] Int. Cl.$^4$ .............................................. B60T 8/66
[52] U.S. Cl. ................................... 303/109; 303/106; 303/97; 303/DIG. 4; 364/426
[58] Field of Search .................... 303/95, 96, 97, 105, 303/106, 109, 110, 61, 115, 119; 364/426; 189/181 A, 181 C, 181 R

[56] References Cited

U.S. PATENT DOCUMENTS

| | | | |
|---|---|---|---|
| 3,514,160 | 5/1970 | Leiber | 303/119 |
| 3,515,440 | 6/1970 | Every et al. | 303/115 |
| 3,521,934 | 7/1970 | Leiber | 303/119 |
| 3,540,780 | 11/1970 | Okamoto et al. | 303/106 |
| 3,630,579 | 12/1971 | Rodi | 188/181 A |
| 3,731,979 | 5/1973 | Mikaila | 303/DIG. 4 |
| 3,850,480 | 11/1974 | Atkins | 303/106 |
| 3,857,613 | 12/1974 | Avikawa | 303/109 |
| 3,870,376 | 3/1975 | Riordan | 303/106 |
| 3,880,474 | 4/1975 | Scharlack | 303/106 |
| 3,953,080 | 4/1976 | Bremer | 303/106 |
| 4,036,537 | 7/1977 | Fleagle | 303/106 |
| 4,077,675 | 3/1978 | Leiber et al. | 303/106 |
| 4,418,966 | 12/1983 | Hattwig | 303/119 |
| 4,462,642 | 7/1984 | Leiber | 303/DIG. 4 |

*Primary Examiner*—John W. Caldwell, Sr.
*Assistant Examiner*—Alvin Oberley
*Attorney, Agent, or Firm*—Ralph J. Skinkiss; Mark J. Sobanski

[57] ABSTRACT

In accordance with the present invention, a normally open isolation valve is connected between a master cylinder and the selected wheel brakes, and a normally closed dump valve is connected between the selected wheel brakes and a fluid accumulator. A computer control module is connected to operate the isolation valve and the dump valve. In operation, when a slip condition of the controlled wheels is detected, the computer control module closes the isolation valve to hold fluid pressure to the controlled brakes at a relatively constant level. If the deceleration of the controlled wheels exceeds a predetermined amount, the computer control module will selectively open the dump valve to enable fluid to flow into the accumulator, thereby reducing the deceleration of the associated wheels. After the isolation valve has been closed and the slip condition is corrected, the computer control module can detect when the vehicle travels from a low friction surface such as wet asphalt to a high friction surface such as a dry concrete, because the braked wheels of the vehicle which are not controlled by the skid control system will cause an increase in deceleration of the vehicle. Under these conditions, pressure to the controlled wheel brakes can generally be increased without causing a lock-up condition. The control module is responsive to an increase in wheel deceleration above a predetermined rate to selectively open the isolation valve after the valve has been closed to gradually increase pressure to the controlled wheel brakes.

50 Claims, 18 Drawing Figures

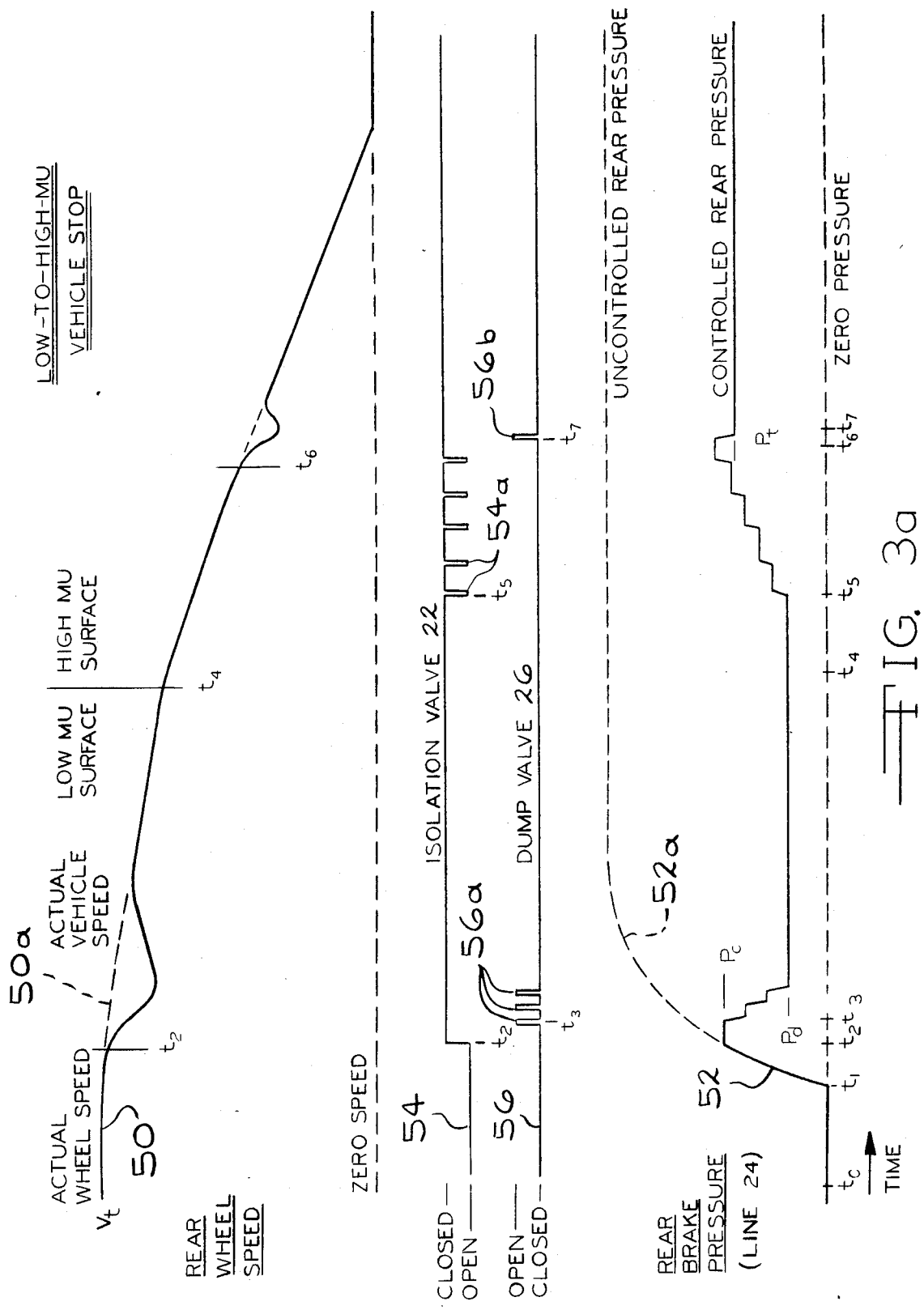

VEHICLE SKID CONTROL SYSTEM

BACKGROUND OF THE INVENTION

The present invention relates generally to a vehicle skid control system and, in particular, to a vehicle skid control system for controlling the braking of a predetermined number of wheels of a multi-wheeled vehicle having at least one braked wheel which is not controlled by the skid control system.

Braking a vehicle in a controlled manner under adverse conditions such as rain, snow, or ice generally requires precise application of the brakes by the vehicle driver. Under these conditions, or in panic stop situations, a driver will often apply excessive brake pressure, thus causing the wheels to lock such that excessive slippage between the wheels and the road surface takes place. Wheel lockup conditions can lead to loss of directional stability and, possibly, uncontrolled vehicle spinout.

In a continuing effort to improve the operational safety of vehicles, many companies have been involved in the development of skid control braking systems. While typically such systems are adapted to control the braking of each braked wheel of a vehicle, some systems have been developed for controlling the braking of only a portion of the braked wheels. Examples of prior art skid control systems are disclosed in U.S. Pat. Nos. 3,515,440; 3,870,376; and 3,880,474.

Generally, prior art skid control systems include a central control unit for monitoring the speed of the controlled wheels to determine the deceleration of the controlled wheels. When the brakes of the vehicle are applied and the wheel deceleration of the monitored wheels exceeds a predetermined deceleration threshold, indicating that there is wheel slippage and the wheels are approaching a lockup condition, the central control unit functions to control the application of hydraulic pressure to the associated brakes to prevent lockup of the controlled wheels. Typically, the skid control system includes means for cyclically relieving and reapplying pressure to the associated brakes to limit wheel slippage to a safe level while continuing to produce adequate brake torque to decelerate the vehicle as desired by the driver. In these systems, the means for reapplying pressure is generally a separate hydraulic power source.

Despite the tremendous advantages a skid control system can provide in stopping a vehicle in a controlled manner under adverse braking conditions, very few vehicles are actually provided with such control systems. One of the chief reasons for this is that such systems are somewhat sophisticated and expensive, and are therefore typically only found on more expensive vehicles.

SUMMARY OF THE INVENTION

The present invention concerns a unique skid control system which, unlike prior art skid control systems, does not operate in a cyclic manner. As mentioned above, prior art skid control systems are typically operated in a cyclic manner by continuously relieving and reapplying pressure to the controlled wheel brakes to control slippage of the associated wheels. In order to provide a sufficient supply of pressurized fluid, such systems typically utilize a separate or supplemental hydraulic power source. The system of the present invention does not operate in the conventional cyclic manner and thus does not require a separate or supplemental hydraulic power source.

Basically, with the system of the present invention, when an incipient wheel lock condition of the controlled wheels is detected, further application of fluid pressure to the controlled wheel brakes is cut off and the fluid pressure to the controlled wheel brakes at that time is held at a relatively constant level, and is maintained at that level during the completion of the wheel stop unless certain conditions are present. For example, if after the brake pressure is held, the controlled wheel deceleration exceeds a predetermined amount, the brake pressure to the controlled wheels is selectively reduced to prevent excessive wheel slippage. Also, after a wheel slip condition has been corrected, the system is designed to detect when the vehicle travels from a relatively low friction surface (i.e. ice) to a relatively high friction surface (i.e. concrete). In these instances, the braked wheels not controlled by the skid control system will cause the vehicle to decelerate at a greater rate. Under these conditions, the brake pressure applied to the controlled wheels can generally be increased without causing a lockup condition. The present system detects such an increase in deceleration and will selectively cause additional pressure to be supplied to the controlled wheel brakes.

More specifically, the skid control system of the present invention is specifically adapted for use with a vehicle having first and second sets of wheel brakes. A brake pedal is operable by the vehicle operator and is connected to actuate a master cylinder for supplying pressurized brake fluid. The pressurized brake fluid is supplied to a first brake pressurizing circuit to actuate the first set of wheel brakes, and is also supplied to a second brake pressurizing circuit to actuate the second set of wheel brakes. In accordance with the present invention, the second brake pressurizing circuit includes a normally open isolation valve connected between the master cylinder and the second set of wheel brakes and a normally closed dump valve connected between the second set of wheel brakes and a fluid reservoir.

The skid control system further includes a computer control module connected to operate the isolation valve and the dump valve. The control module is coupled to monitor the speed of the second set of wheels for generating a wheel speed signal and is responsive to the wheel speed signal for determining the deceleration of the second set of wheels. The control module is responsive to the wheel speed signal for generating a speed ramp signal representing the speed at which the vehicle would travel if decelerated at a predetermined rate. When the difference between the speed ramp signal and the wheel speed signal is more than a predetermined slip threshold, a slip condition is detected, and the control module closes the isolation valve to hold the brake pressure to the second set of wheels at a relatively constant level. If, after the isolation valve has closed, the monitored wheel deceleration exceeds a predetermined amount, the control module is operable to selectively open the dump valve to cause fluid to flow into the fluid reservoir to selectively reduce pressure to the second set of wheels and reduce deceleration of the wheels to prevent excessive wheel slippage.

As previously mentioned, after a wheel slip condition has been corrected, the present vehicle skid control system can detect when the vehicle travels from a relatively low friction surface to a relatively high friction surface. This is accomplished by the control module monitoring the wheel deceleration rate of the second set of wheels. When there is no wheel slip and a predetermined increase in wheel deceleration is detected, this indicates that the vehicle has traveled onto a higher friction surface. In these instances, the control module will selectively open the isolation valve to permit pressurized fluid from the master cylinder to be supplied to the second set of wheel brakes and thereby increase braking.

BRIEF DESCRIPTION OF THE DRAWINGS

The above, as well as other advantages of the present invention, will become readily apparent to one skilled in the art when the following detailed description of the invention is read in conjunction with the attached drawings, in which:

FIGS. 3a and 3b are waveform diagrams generally illustrating the operation of the skid control system;

DESCRIPTION OF THE PREFERRED EMBODIMENT

Figure 1:
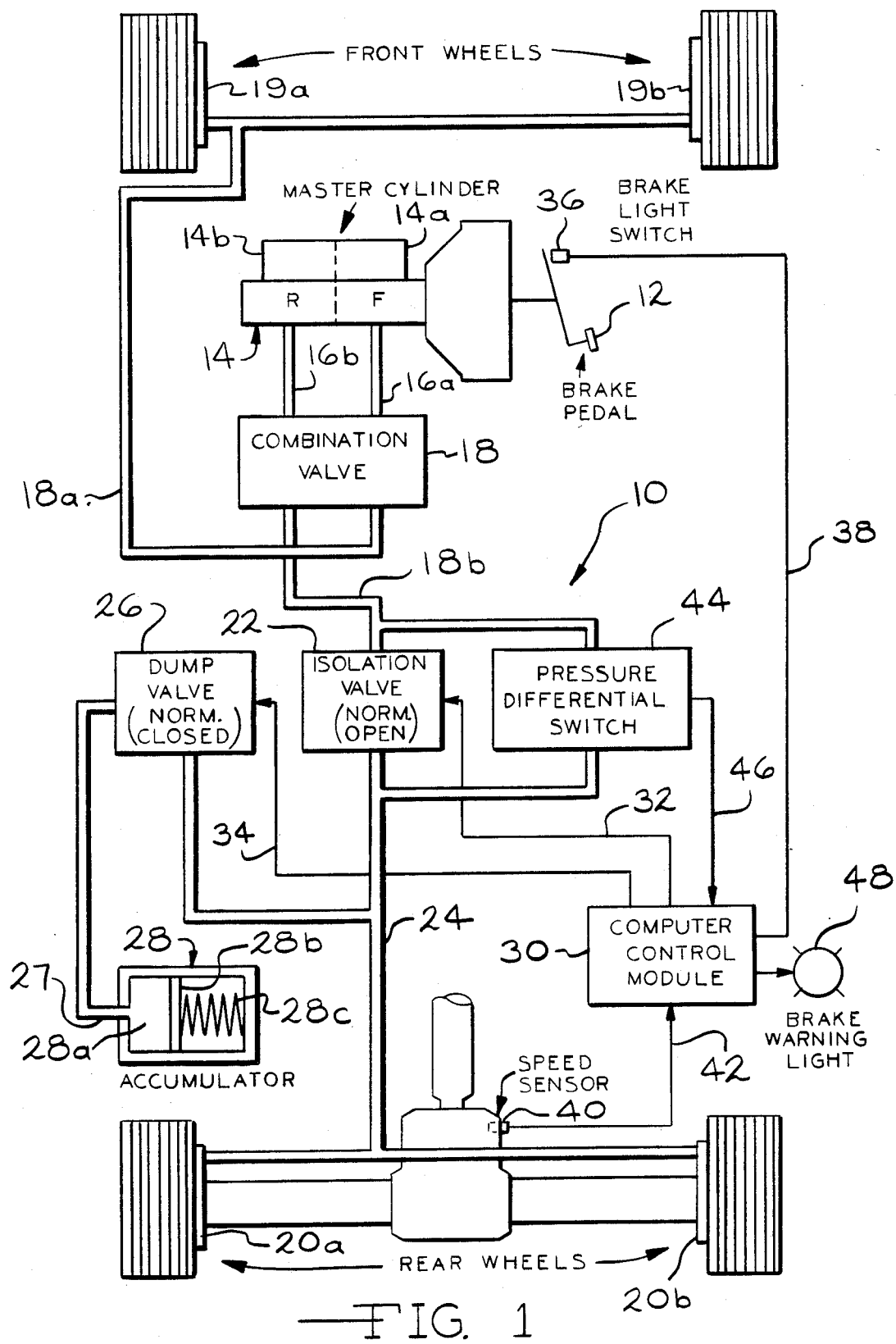
FIG. 1 is a schematic diagram illustrating the skid control system of the present invention.

Referring to the drawings, and particularly to FIG. 1, there is shown a schematic diagram illustrating the components of an anti-skid control system 10 according to the present invention. The anti-skid control system of the present invention is specifically adapted to monitor and control the braking of a predetermined number of wheels of a multi-wheeled vehicle having at least one braked wheel which is not connected to the anti-skid control system. For example, as illustrated in FIG. 1, the anti-skid control system can be utilized to control the braking of the rear wheels of a four wheeled vehicle wherein the front brakes of the vehicle are not controlled by the anti-skid control system. Such a system is especially desirable for a vehicle such as a small truck, for example, wherein the weight supported by the rear wheels can vary greatly due to the wide range of payloads the truck may be transporting.

As shown in FIG. 1, the anti-skid control system 10 is installed on a vehicle having a hydraulic braking system consisting of a brake pedal 12 coupled to operate a dual reservoir master cylinder 14. When the vehicle operator depresses the brake pedal 12, the master cylinder 14 supplies hydraulic fluid under pressure from a front reservoir 14a through a hydraulic line 16a and from a rear reservoir 14b through a hydraulic line 16b to a conventional combination valve 18. The combination valve 18 includes a first output line 18a adapted to supply hydraulic fluid at a first predetermined pressure to actuate the vehicle front brakes 19a and 19b and a second output line 18b which supplies fluid at a second predetermined pressure to actuate the vehicle rear brakes 20a and 20b. While not shown in the drawings, the combination valve 18 is typically provided with an integral pressure differential switch for detecting a predetermined pressure difference between the fluid in the lines 16a and 16b, which difference is indicative of a partial brake failure.

In accordance with the present invention, a normally open isolation valve 22 is connected between the line 18b and a line 24 which supplies the pressurized brake fluid to the rear brakes 20a and 20b. As will be discussed, the isolation valve 22 is solenoid operated and is closed in the event impending rear wheel lockup is detected to hold the pressure in the line 24 and thus prevent any further increase in pressure in the line 18b from being supplied to the line 24.

Also, in accordance with the present invention, a normally closed dump valve 26 is connected between the line 24 and a line 27 which is connected to an accumulator 28. The accumulator 28 includes a variable volume fluid reservoir 28a for containing hydraulic fluid which is maintained at a slightly elevated pressure by a slidable piston 28b biased by a spring 28c. More specifically, the spring 28c maintains the fluid in the accumulator at a pressure slightly above the non-actuated pressure of the fluid in the line 24. As will be discussed, when the isolation valve 22 has been closed and the pressure held in the line 24 continues to cause excessive slippage of the rear wheels, the dump valve 26 is selectively opened to direct fluid into the accumulator 28 to reduce the pressure in the line 24 and prevent lockup of the rear brakes. After the brake pedal 12 has been released, the dump valve 26 can be momentarily opened to return fluid in the accumulator 28 to the line 24. It should be noted that, in some instances, it may be desirable to delete the accumulator 28 and connect the line 27 to return fluid to the master cylinder rear reservoir 14b.

The operation of the isolation valve 22 and the dump valve 26 is controlled by a computer control module 30. The isolation valve 22 and the dump valve 26 are solenoid operated valves which can be connected to the computer control module by means of electric lines 32 and 34 respectively. In order to determine whether the vehicle operator is in the process of braking the vehicle, the computer control 30 is connected to a brake light switch 36 by a line 38 to monitor whether of the brake pedal 12 is depressed. The computer control module 30 is also connected to a speed sensor 40 by a line 42 to monitor the speed of the vehicle rear wheels.

In addition to monitoring the position of the brake pedal 12 via the brake light switch 36 and the rear wheel speed via the speed sensor 40, the computer control module 30 is connected to a pressure difference switch 44 by a line 46. The pressure differential switch 44, whose function will be discussed in more detail hereinafter, is coupled to monitor the pressure difference between the fluid in the lines 18b and 24 and is adapted to close when the pressure in the line 18b is greater than the pressure in the line 24. Typically, there is some hysteresis associated with the operation of the pressure differential switch 44 such that the switch 44 does not chatter between an on and off condition when the pressure in the line 18b remains relatively equal to the pressure in the line 24. Also, the control module 30 is connected to a brake warning light 48 which is activated in the event a failure in the anti-skid brake system is detected.

Basically, the system of the present invention monitors the rear wheel speed and deceleration and, during a vehicle stop, functions to control the application of hydraulic pressure to the vehicle rear brakes in order to prevent a lockup condition of the brakes. In the event a wheel slip condition is detected, indicating the rear brakes are approaching a lockup condition, the control module 30 closes the isolation valve 22 to hold the pressure in the line 24 at its present value. If, after the isolation valve 22 has been closed, the rear wheel deceleration rate exceeds a predetermined amount, the dump valve 26 can be selectively opened to reduce the pressure in the line 24 to prevent a lockup condition of the brakes.

Also, in accordance with the present invention, after an impending lockup condition has been corrected, the rate of change of deceleration of the rear wheels is monitored to detect instances wherein the vehicle travels from a road surface such as ice wherein the coefficient of friction between the vehicle and the road surface is relatively low (low mu surface) to a road surface such as concrete wherein the coefficient of friction between the vehicle and the road surface is relatively high (high mu surface). In these instances, when the vehicle front wheels contact the higher mu surface, the uncontrolled front brakes will cause an increase in the rate of deceleration of the vehicle as the vehicle travels from the low mu surface to the high mu surface. Under these conditions, the pressure held in the line 24 to the rear brakes can generally be increased to provide further braking without causing a lockup condition of the rear brakes. This is accomplished by selectively opening the isolation valve 22 to permit the higher pressure fluid in the line 18b to be supplied to the line 24. Due to the continued braking effort by the driver on the vehicle brake pedal under a hard braking condition, the pressure in the line 18b will generally be higher than the pressure in the line 24.

Figure 2A:
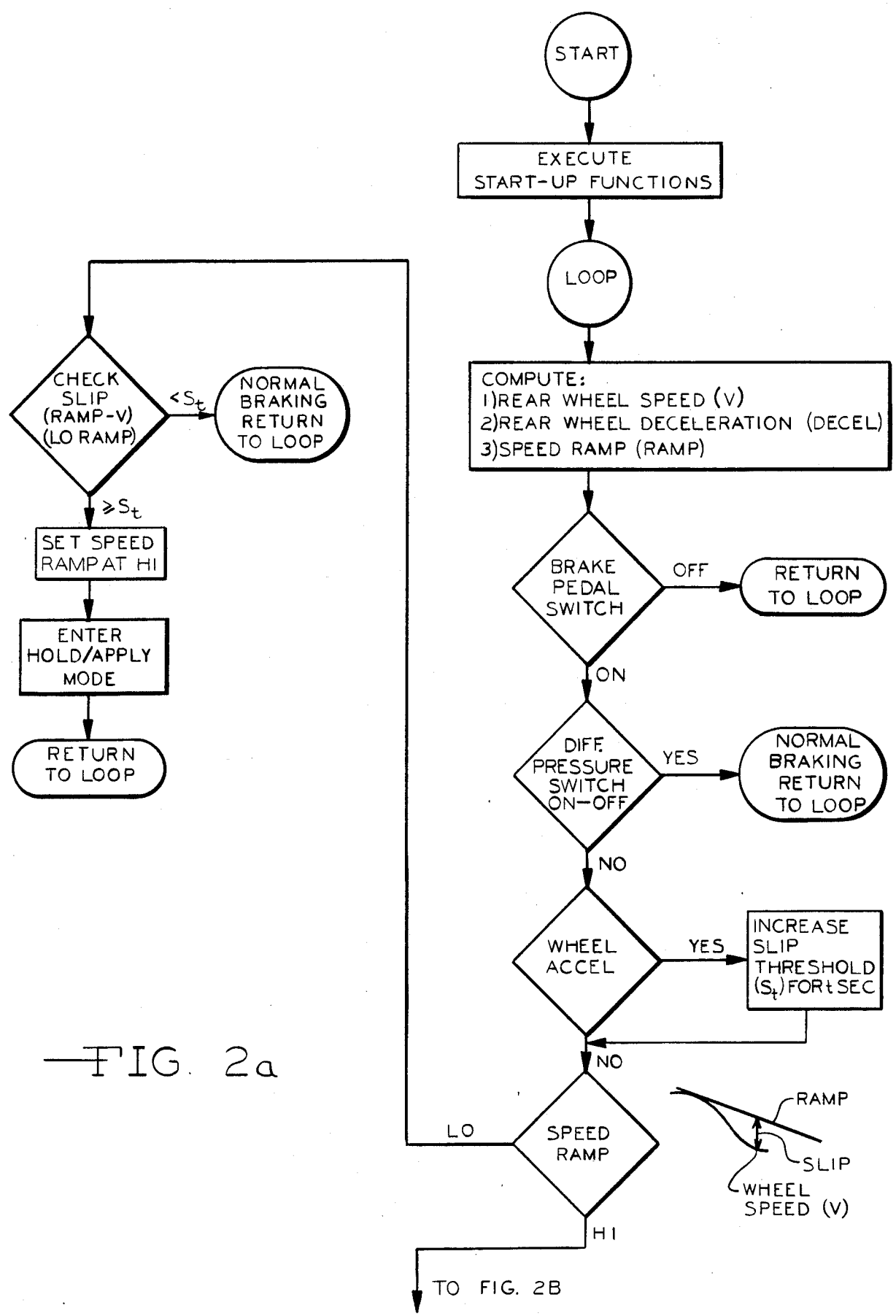
FIGS. 2a and 2b represent a simplified flow diagram illustrating the operation of the skid control system of the present invention.
Figure 2B:
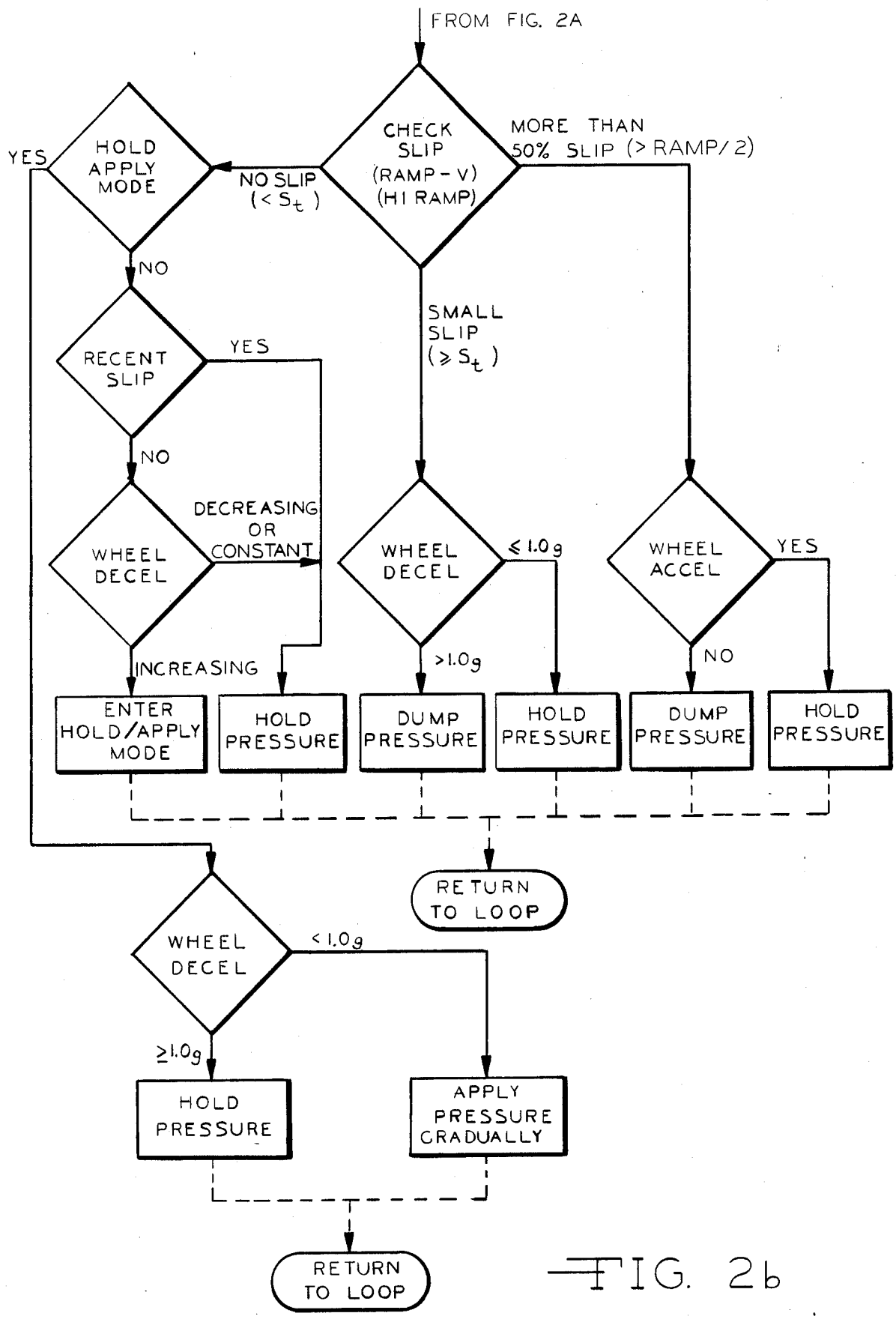

Referring now to FIGS. 2a and 2b, there is shown a simplified flow diagram illustrating the basic operation of the anti-skid control system of the present invention. The program is initiated in FIG. 2a by entering a processing function wherein various startup functions such as the checking of the ROM and RAM memory of the computer control module 30, a wiring check, and the initial pulsing of the isolation valve 22 and the dump valve 26 are executed. After the startup functions have been performed, the program enters a "loop" through which the program will continue to cycle, while monitoring various parameters of the system and, if required, operating the isolation valve 22 and the dump valve 26 to control the rear wheel braking.

Initially, the program senses the rear wheel vehicle speed via the speed sensor 40 and determines a present rear wheel speed value (V) and a rear wheel deceleration value (DECEL). Also, the program calculates a speed ramp value (RAMP) which represents the speed at which the vehicle would travel if it is decelerated at a predetermined rate. Initially, the speed ramp value is calculated based on a relative low (LO) deceleration rate (typically in the range of 0.5 g to 0.9 g) and later, as will be discussed, it is recalculated at a higher (HI) deceleration rate (typically in the range of 0.9 g to 1.3 g).

After the above calculations have been performed, the program enters a decision point to determine whether the brake pedal switch 36 is on or off. If the brake switch is off, the driver is not requiring any braking and the program returns to the beginning of the loop. If the brake pedal switch is on, the program enters a decision point to determine the present status of the pressure differential switch 44 relative to the previous status of the switch. When the differential pressure switch is in the on state, this indicates that the isolation valve has closed and that the pressure in the line 18b is greater than the pressure in the line 24 and, when the switch is in the off state, this indicates that the pressure in the line 18b is equal to or has dropped below the pressure in the line 24. In instances wherein the switch 44 has turned on, and has subsequently turned off, this indicates a situation wherein the operator has initially applied a relatively heavy braking effort to the brake pedal to cause the isolation valve to close to prevent lockup of the rear wheels and, subsequently, has reduces braking effort to the pedal without necessarily completely releasing the pedal. It is in this situation where it is desirable to release the anti-lock mode and return the braking system to the normal operating mode. Thus, if the program senses that the pressure differential switch 44 has at one point turned on, but is now off, the program will cause the system to return to the normal braking mode and the beginning of the loop.

If, however, the pressure differential switch 44 has not cycled through these conditions, the program enters a decision point to check whether, during the braking of the vehicle, the rear wheels are accelerating. If the wheels are accelerating, the program enters a processing function wherein a slip threshold value ($S_t$), which represents the amount of rear wheel slip which must be detected before the anti-lock system is activated, is increased for a predetermined time period (t sec). It has been found that wheel acceleration detected during braking of a vehicle often reveals the presence of spurious oscillations in wheel speed having a predictable cyclic time period (e.g. 100 m sec). It has been found that, when such spurious wheel acceleration is detected, it is desirable to increase the slip threshold $S_t$ during this time period.

After the slip threshold ($S_t$) has been increased, or if no wheel acceleration is detected, the program enters a decision point which, depending on the particular speed ramp calculation (LO or HI), routes the program in two different directions. If the speed ramp has been calculated at the LO rate, the program enters a decision point to determine whether a computed slip value (SLIP) has exceeded the preset slip threshold $S_t$. The SLIP value represents the difference between the calculated RAMP value and the actual rear wheel speed V. When the SLIP value (RAMP−V) is less than the threshold $S_t$, the system can remain in the normal braking operation mode and return to the beginning of the loop. However, when the computed SLIP value is greater than or equal to the threshold $S_t$, the program enters a processing function to set the next RAMP calculation at the HI rate. Next, the program enters a HOLD/APPLY mode wherein the computer control 30 initially closes the isolation valve 22 to isolate the line 24 from the line 18b and hold the pressure in the line 24 at a constant level but, if the rear wheels are decelerating below a predetermined rate, selectively pulses the isolation valve 22 open to allow pressure from the line 18b to enter the line 24, thereby increasing the braking effort at the rear wheels. The program then returns to the beginning of the loop to recompute the rear wheel speed, the rear wheel deceleration, and the speed ramp value at the HI rate.

Referring back to the decision point wherein the program checks whether the RAMP value has been calculated based on either a LO or HI deceleration rate, and the RAMP value has been calculated based on the HI rate, the program enters a processing function (FIG.

2b) to compare the rear wheel slip value (SLIP) with the slip threshold ($S_t$). If the slip threshold is not exceeded (SLIP<$S_t$), the program enters a decision point to check whether the system is presently in the HOLD-/APPLY mode. If the system is in the HOLD/APPLY mode, the program enters a decision point to compare the present rear wheel deceleration (DECEL) with a predetermined rate such as, for example, 1.0 g. When the wheel deceleration (DECEL) is greater than or equal to 1.0 g, the program enters a processing function to place the system in the HOLD pressure mode, wherein the isolation valve 22 remains closed to hold the pressure in the line 24 at its present level. If the wheel deceleration is less than 1.0 g, the program enters a processing function to gradually increase pressure to the rear brakes. This can be accomplished by selectively opening the isolation valve 22.

If, after determining that the slip threshold is not exceeded (SLIP<$S_t$), and the system is not in the HOLD/APPLY mode, the program enters a decision point (RECENT SLIP) to check whether, over a last predetermined time period, the SLIP value has exceeded the threshold $S_t$. If the answer is yes, it is desirable to continue to hold pressure to the rear brakes, and thus the program enters the HOLD pressure mode. If the slip threshold has not been recently exceeded, the program enters a decision point and checks the rear wheel deceleration (DECEL). When the rear wheel deceleration is decreasing or constant, the program, depending on the previous mode entered by the system, either enters or remains in the HOLD pressure mode. On the other hand, if increasing wheel deceleration is detected, this indicates that the vehicle may have traveled from a low mu surface to a higher mu surface such that the system can provide increased pressure at the rear wheels. Thus, the program enters the previously discussed HOLD/APPLY mode.

Referring back to the decision point wherein the program checks the rear wheel slip based on the HI speed ramp value (RAMP), if a relatively small amount of slip is detected (RAMP/2≧SLIP≧$S_t$) when the actual rear wheel SLIP value is based on the HI speed ramp value (RAMP), the program then enters a decision point to compare the rear wheel deceleration (DECEL) with respect to a 1.0 g deceleration rate. If the wheel deceleration rate is less than or equal to 1.0 g, the program enters or remains in the HOLD pressure mode and, if the wheel deceleration is greater than the 1.0 g rate, the program enters a DUMP pressure mode wherein the dump valve 26 is selectively opened to reduce pressure in the rear brake line 24 to reduce the rear wheel deceleration and prevent lockup of the rear wheels.

Referring back again to the decision point wherein the rear wheel slip is checked based on the HI speed ramp value, when there is more than 50% slip (SLIP>RAMP/2), the program enters a decision point to determine whether there is any wheel acceleration at this time. If there is wheel acceleration, the program enters the HOLD pressure mode and, if there is no wheel acceleration, the program enters the DUMP pressure mode to reduce the pressure in the rear brake lines. After checking the rear wheel slip and entering or remaining in either the HOLD pressure mode, the DUMP pressure mode, or the HOLD/APPLY mode, the program returns to the beginning of the loop and then cycles down through the various instructions of the loop. Depending on the braking conditions at this time, the program can branch to different sections to either remain in a particular mode, change to a different mode or, possibly, return to a normal braking mode.

Figure 3B:
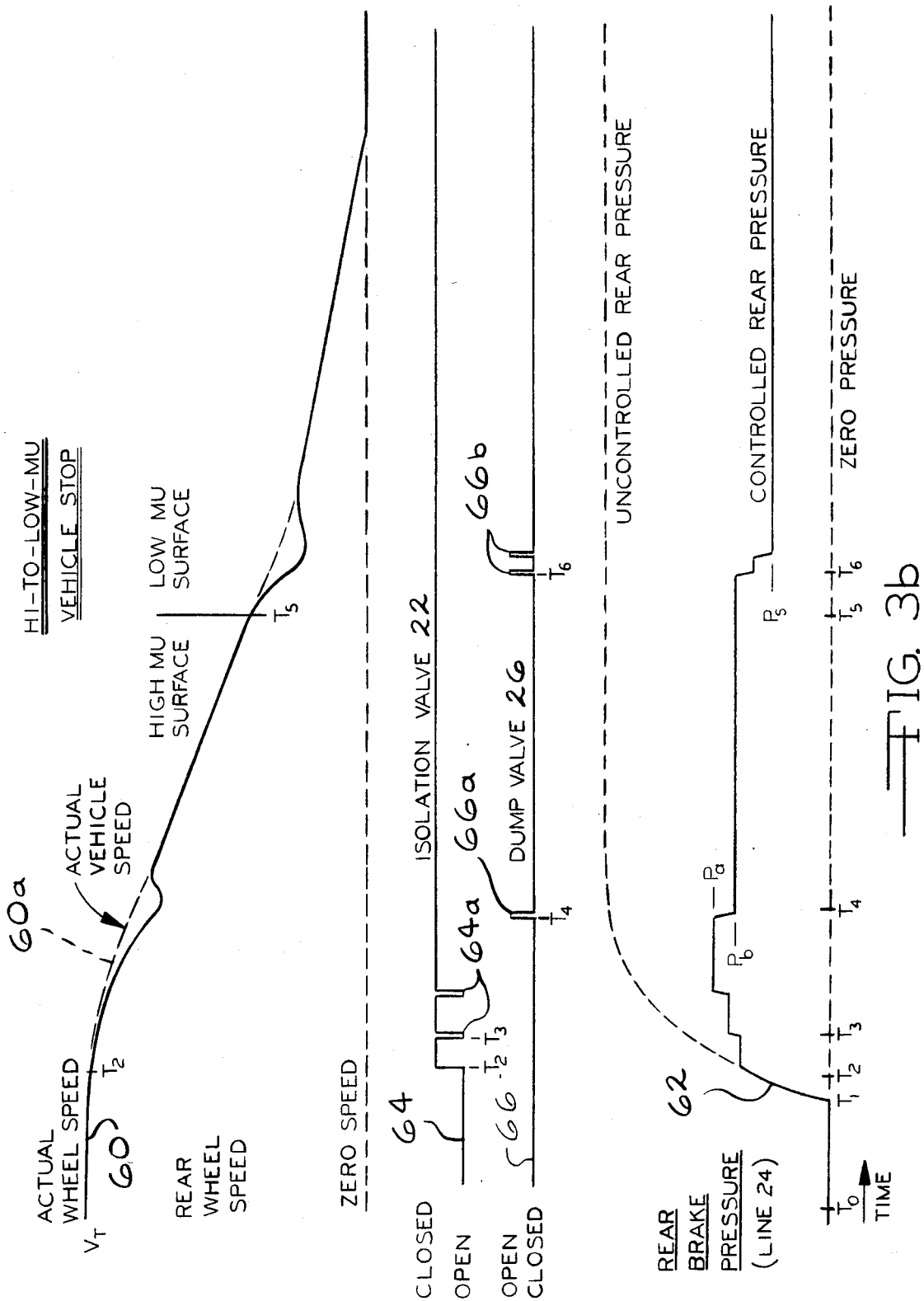

Referring to FIGS. 3a and 3b, there are shown waveform diagrams which can be utilized to generally describe the operation of the skid control system of the present invention. In particular, FIG. 3a illustrates the operation of the skid control system as the vehicle travels from a relatively low mu surface to a relatively high mu surface during the vehicle stop. FIG. 3b illustrates the case wherein the vehicle travels from a high mu surface to a low mu surface during a vehicle stop.

Referring now to FIG. 3a, the actual rear wheel speed is indicated by curve 50, while the actual rear wheel brake pressure is indicated by curve 52. The operation of the isolation valve 22 is represented by waveform 54, while the operation of the dump valve 26 is represented by waveform 56. Initially, at time $t_0$, the vehicle is traveling along a relatively low mu surface at a speed $V_t$ without the vehicle brakes applied. At this time, the isolation valve 22 is open, while the dump valve 26 is closed. At time $t_1$, the driver initiates a vehicle stop to increase the brake pressure in the line 24 and the vehicle begins to decelerate. Initially, the brake pressure in the line 24 is not sufficient to cause any lockup of the rear wheels. However, at time $t_2$, the rear wheel speed begins to slip relative to the actual vehicle speed (dashed curve 50a). When the computer control module 30 determines that the slip threshold has been exceeded, the module 30 generates a signal to close the isolation valve at time $t_2$, thus holding the pressure in the line 24 at a constant level $P_c$, and preventing a further uncontrolled increase in pressure as represented by dashed curve 52a.

Since the rear wheel continues to slip after the isolation valve 22 has been closed, the computer control module will generate a series of one or more dump pulses 56a, commencing at time $t_3$, to selectively reduce the brake pressure in the line 24 so as to return the actual rear wheel speed to the actual vehicle speed. After the wheel slip has been corrected, the isolation valve 22 and the dump valve 26 will both remain closed to maintain the pressure in the line 24 at a constant level $P_d$ and decelerate the vehicle in a controlled manner.

However, when the vehicle travels from the low mu surface to a high mu surface (time $t_4$), such as when the vehicle travels from a wet asphalt surface onto a dry concrete surface, the braked front wheels of the vehicle, which are not controlled by the computer control module, will contact the higher mu surface and will cause the vehicle to decelerate at a greater rate. This increase in vehicle deceleration is detected by the control module 30, and indicates to the system that the vehicle has traveled from a low mu surface to a higher mu surface and that it may be desirable to apply additional brake pressure to the rear brakes. Thus, at time $t_5$, the control module 30 will generate a series of reapply pulses 54a to selectively open the isolation valve 22 and increase the rear brake pressure. In the event the rear brake pressure is increased to a point wherein the rear wheels begin to slip (as shown at time $t_6$), a dump pulse 56b can be generated at time $t_7$ to reduce the rear brake pressure to a level $P_t$ such that the wheel slip is corrected.

Referring now to FIG. 3b, there is shown the operation of the system during a vehicle stop wherein the vehicle travels from a high mu surface to a lower mu surface. In FIG. 3b, the actual rear wheel speed is represented by curve 60, while the actual rear brake pressure is represented by curve 62. The operation of the isolation valve 22 is represented by waveform 64, while the operation of the dump valve 26 is represented by waveform 66.

Initially, the vehicle is traveling at a speed $V_T$ at time $T_0$ without the vehicle brakes applied. At time $T_1$, the operator applies the vehicle brakes and the pressure in the line 24 begins to increase. At time $T_2$, the rear wheel begins to slip relative to the actual vehicle speed (dash curve 60a). The control module senses this wheel slip and closes the isolation valve 22 at time $T_2$. However, after the isolation valve 22 has been initially closed, since there is not significant slip between the actual rear wheel speed and the actual vehicle speed, the control module will continue to pulse the isolation valve open by generating pulses 64a (commencing at time $T_3$) to selectively increase the rear brake line pressure to a level $P_a$ until significant wheel slippage is detected, at which time ($T_4$) the dump valve 26 is temporarily opened by a dump pulse 66a to reduce the rear brake pressure to a level $P_b$ and return the actual rear wheel speed to the actual vehicle speed.

At time $T_5$, when the vehicle travels from a high mu surface to a lower mu surface, the brake pressure held in the line 24 will cause rear wheel slippage. Thus, the control module 30 will generate one or more dump pulses 66b to reduce the rear brake pressure to a level $P_s$ and correct the wheel slippage condition.

Figure 4:
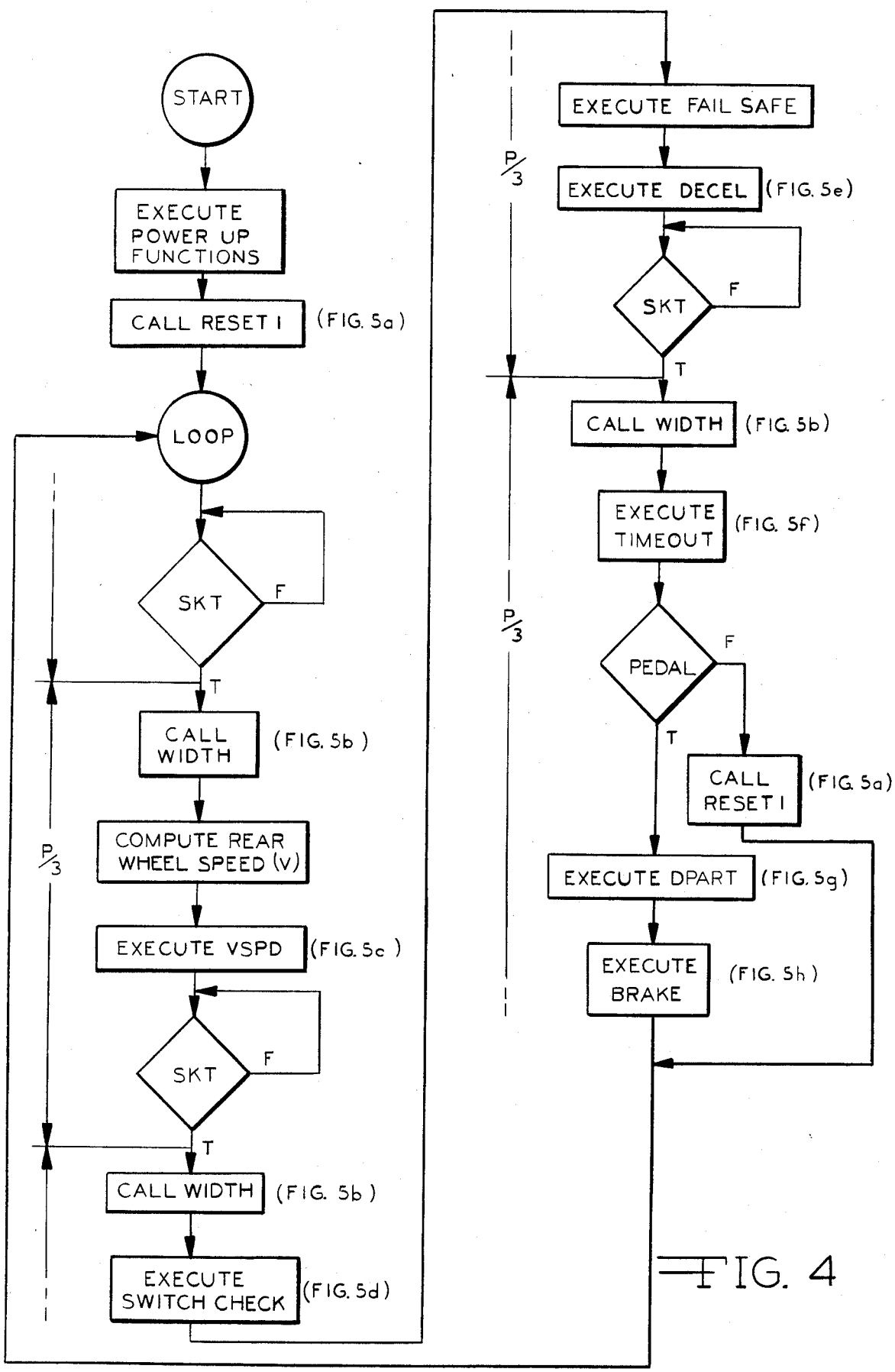
FIG. 4 is a more detailed flow diagram illustrating the main program of the brake control system of the present invention.
Figure 5A:
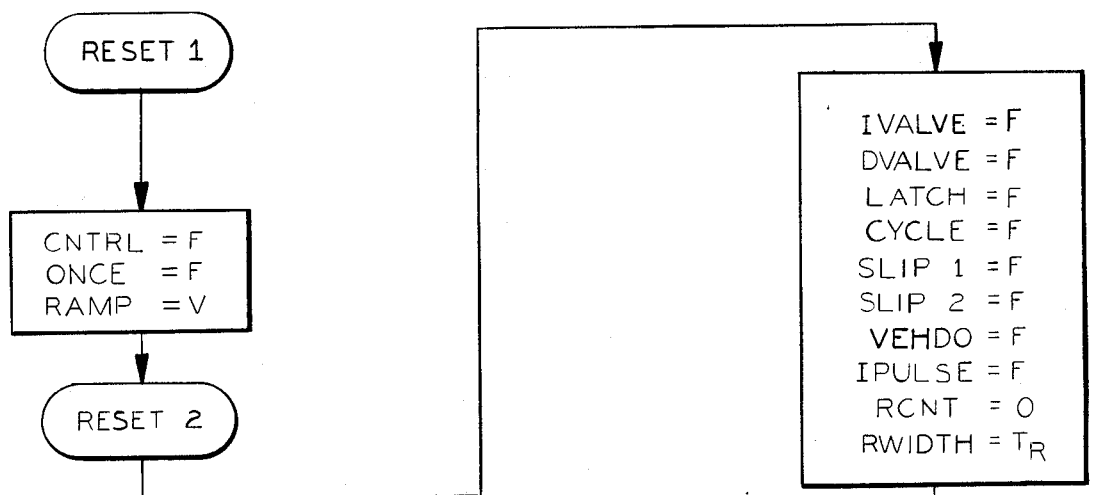
FIGS. 5a through 5h and FIGS. 6a through 6d are subroutines which are utilized by the main program of FIG. 4 in controlling a vehicle stop.

With reference to FIGS. 4, 5a through 5h, and 6a through 6d, the operation of the anti-skid control system of the present invention will now be discussed in detail. Referring now to FIG. 4, there is shown the main program of the present invention. The main program is initiated at a circle start and enters a processing function to execute various powerup functions such as checking the computer memory, initially pulsing the dump and isolation valves if the brake is not applied, and checking the associated wiring circuits. After the powerup functions are performed, the program calls a subroutine RESET1 which is shown in FIG. 5a.

Basically, the RESET1 subroutine is designed to initially set a plurality of logic flags and to assign initial values to certain variables. The following table defines a portion of the logic flags utilized throughout the main program of FIG. 4 and the associated subroutines. The definitions set forth below apply when the respective logic flags are set true.

LOGIC FLAGS (Definition for true (T) value)

ACC: Rear wheel acceleration greater than a predetermined reference value (AREF).
CNTRL: Speed ramp value (RAMP) calculated at HI rate-system in anti-lock mode.
CYCLE: Wheel speed departure and recovery cycle underway (system in process of dumping pressure to correct excessive wheel slip).
DEC: Rear wheel deceleration greater than 1.0 g.
DIFF: Pressure differential switch 44 closed.
DVALVE: Dump valve solenoid energized (valve open).
HOFF: Slip threshold at increased value for predetermined time period due to spurious wheel acceleration.
IPULSE: Isolation valve in pulsing (hold/apply) mode.
IVALVE: Isolation valve solenoid energized (valve closed).
LATCH: Anti-lock system latched on.
ONCE: Initial wheel speed departure and recovery cycle completed.
PEDAL: Brake pedal depressed (brake light switch closed).
SLIP1: Wheel slip greater than slip threshold.
SLIP2: Wheel slip greater than 50%.
VEHDO: New measurement for DVREF (vehicle deceleration reference value) needed.
HOLDW: Reapply pulse width has been determined.

Initially, in the RESET1 subroutine, the CNTRL and ONCE logic flags are set false (F), and the value of the speed ramp (RAMP) is set equal to the present rear wheel vehicle speed (V). Next, the program enters a RESET2 portion of the subroutine RESET1 wherein logic flags IVALVE, DVALVE, LATCH, CYCLE, SLIP1, SLIP2, VEHDO, and IPULSE are all set false. Also, the variable RCNT which represents the total number of reapply pulses generated, is set equal to zero and the variable RWIDTH, which represents the spacing between successive reapply pulses, is set equal to an initial spacing $T_R$. The program then returns to the main program of FIG. 4 to enter a "loop".

Figure 5B:
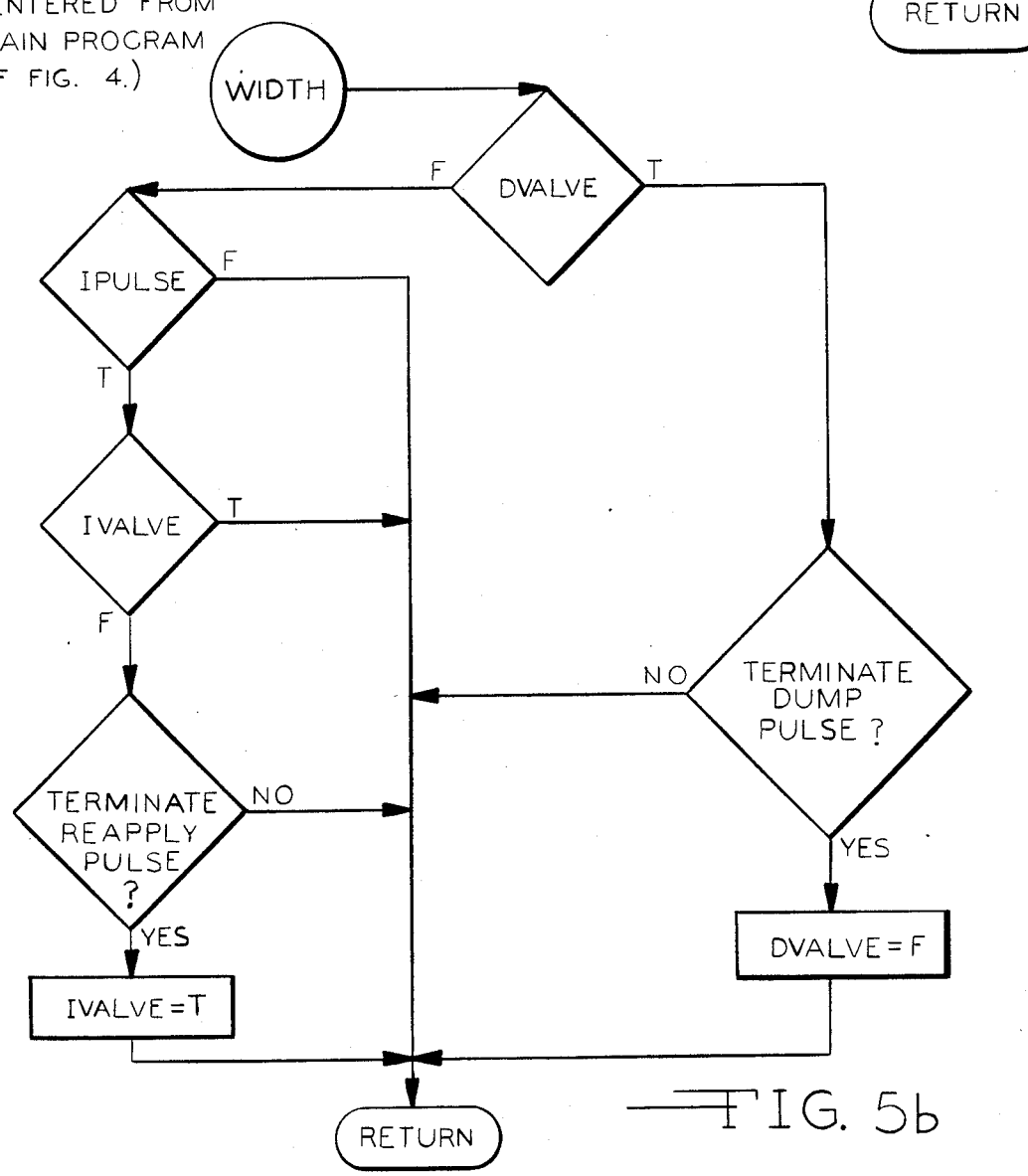

In FIG. 4, the functions following the loop are designed to be performed within a predetermined fixed time period (P). Further, this fixed time period is subdivided into three equal time periods (P/3), each of which is timed by a timer flag SKT. At the beginning of the loop, the program enters a decision point to check the status of the SKT timer flag and, when the SKT flag is false, the program continues to cycle at this point until the flag becomes true. When the SKT flag becomes true, indicating that the time period P/3 has expired, the program enters a processing function wherein a subroutine WIDTH, shown in FIG. 5b, is called. The WIDTH subroutine is specifically utilized to check whether the system is in the process of generating a dump pulse to temporarily open the dump valve 26, or a reapply pulse to temporarily open the isolation valve 22 and, whether either the dump pulse or the reapply pulse should be terminated at this time. As will be discussed, depending on the various operating parameters of the system, the width of either the dump pulse or the reapply pulse is varied.

Initially, the WIDTH subroutine enters a decision point to check the status of the DVALVE logic flag. If the DVALVE flag is true, indicating the dump valve is open, the program enters a decision point to check whether the dump pulse which is maintaining the valve in the open state should be terminated at this time to close the dump valve. If so, the program enters a processing function wherein the DVALVE flag is set false to close the dump valve.

If the DVALVE flag is false when the program enters the WIDTH subroutine, the program enters a decision point to check the status of the IPULSE flag which, when false, indicates that the system is set to maintain the isolation valve either continuously open or continuously closed. When the IPULSE flag is true, indicating that the system is in the hold/apply mode, there is a possibility that the isolation valve may be open due to a reapply pulse and the program enters a decision point to check the status of the isolation valve. If the isolation valve is open, the IVALVE flag will be false, and the program enters a decision point to determine whether the reapply pulse should be terminated at this time. When the reapply pulse is to be terminated, the program enters a processing function to set the IVALVE flag true to close the isolation valve. If the IPULSE flag is false, or the IVALVE flag is true, or if the reapply pulse should not be terminated at this time, the program returns to the main program.

Figure 5C:
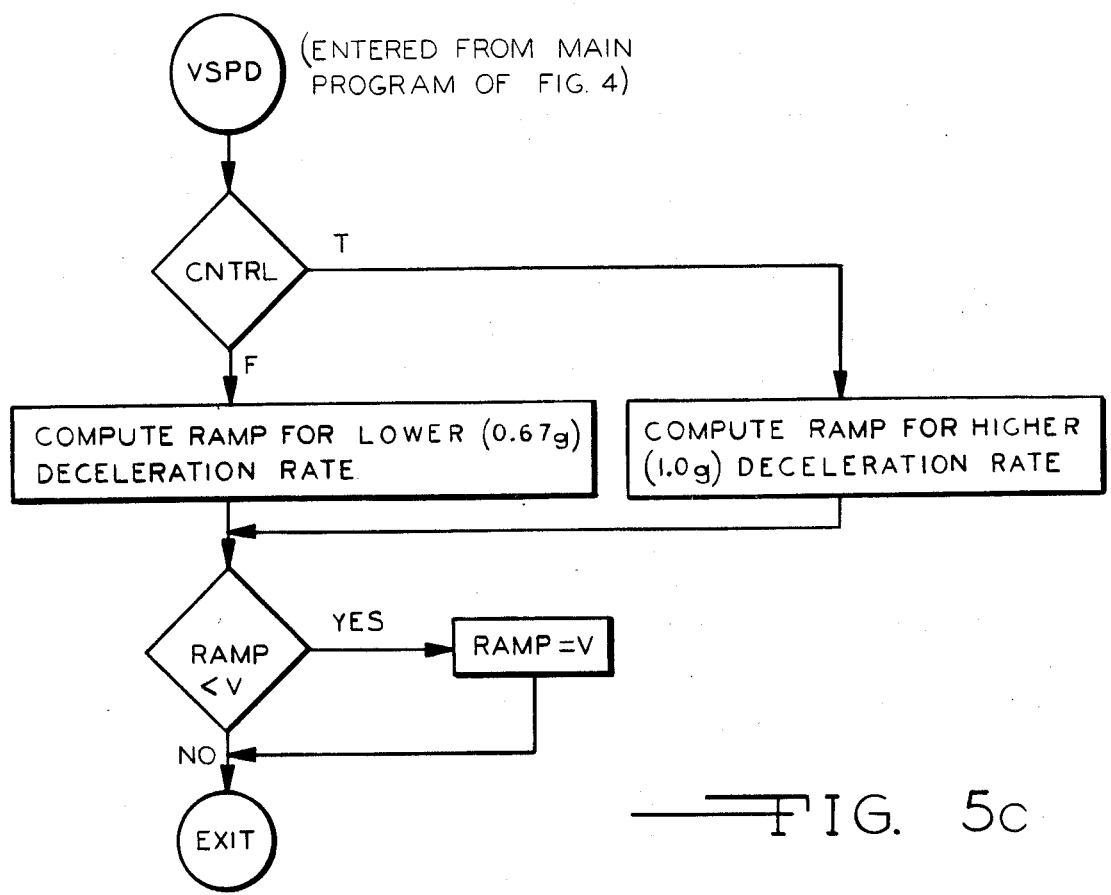

After the WIDTH subroutine has been called, the program enters a processing function wherein the rear wheel vehicle speed (V) is computed. After the vehicle speed is computed, the program enters a processing function wherein a subroutine entitled VSPD and shown in FIG. 5c is executed. Basically, the VSPD subroutine is utilized to compute the speed ramp value (RAMP) which is subsequently utilized to determine whether there is any rear wheel slip. As previously discussed, the computed speed ramp value can be based on one of two different deceleration rates.

Referring to FIG. 5c, the VSPD subroutine begins by entering a decision point to determine the status of the CNTRL flag. Initially, the CNTRL flag is set false by the RESET1 subroutine. However, as will be discussed, after a slip comparison with an initial speed ramp calculation based on a first predetermined deceleration rate (e.g. 0.67 g) has exceeded the predetermined slip threshold, the CNTRL flag is set true such that subsequent slip comparisons are determined relative to a speed ramp value based on a higher deceleration rate (e.g. 1.0 g). When the CNTRL flag is true, this indicates that the system has entered the anti-lock mode. If the CNTRL flag is false, the program enters a processing function to compute a speed ramp value (RAMP) based on the predetermined lower deceleration rate. When the CNTRL flag is true, the program enters a processing function to compute a speed ramp value (RAMP) based on the higher deceleration rate. After the speed ramp value has been determined, the program enters a decision point to determine whether the computed value for RAMP is less than the current vehicle speed (V). If the RAMP value is less than the vehicle speed, the program enters a processing function to set the RAMP value equal to the vehicle speed, since the RAMP value should never be less than the vehicle speed. After the RAMP value has been set equal to the vehicle speed, or if the RAMP value is not less than the vehicle speed, the program exits the VSPD subroutine and returns to the main program of FIG. 4.

The program then enters a decision point to check the status of the SKT timer flag. If the timer flag is false, the program continues to cycle at the SKT decision point until the timer flag has been set true, indicating that the time period P/3 has expired. The main program then enters the second section of the loop wherein the WIDTH subroutine (FIG. 5b) is again called to determine whether there is a reapply pulse or a dump pulse which needs to be terminated at this time. After the WIDTH subroutine has been executed, the program enters a processing function to execute a subroutine entitled SWITCH CHECK and shown in FIG. 5d.

Figure 5D:
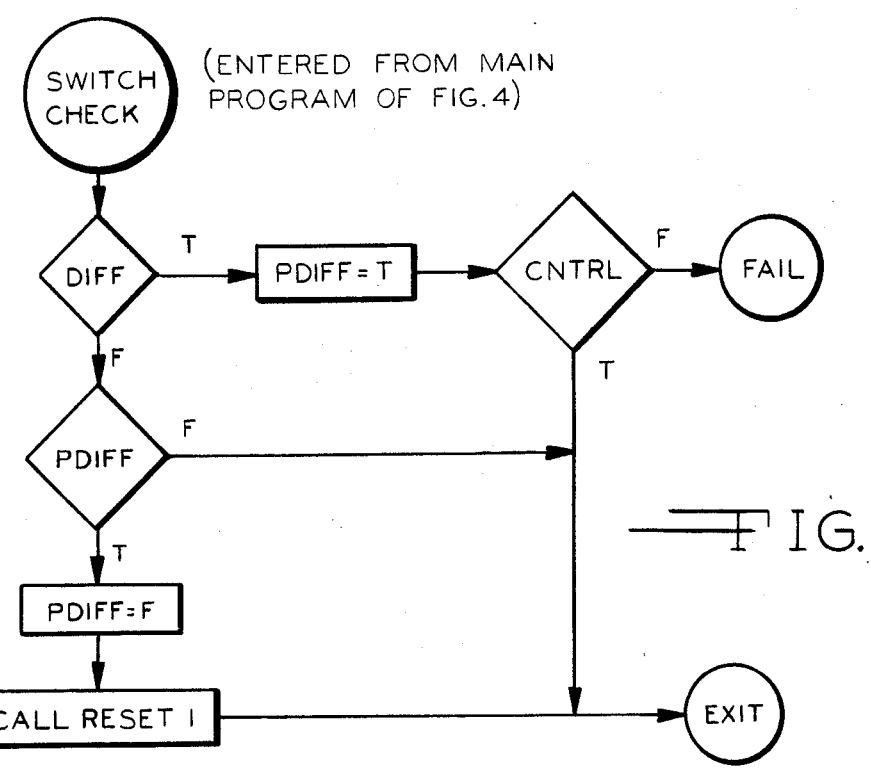

The SWITCH CHECK subroutine of FIG. 5d is basically utilized to review the status of the pressure differential switch 44 as indicated by the DIFF flag. As previously mentioned, there may be instances wherein the driver is still maintaining pressure on the brake pedal such that the PEDAL flag is true, but has not completely released brake pressure. For example, in instances wherein the driver, anticipating a quick stop, initially applies a significant amount of pressure to the brake pedal and causes the system to enter the anti-lock mode, but then realizes that he has additional time to stop and therefore partially releases the brake pedal to reduce the braking rate of the vehicle. In these circumstances, it is desirable to detect the partial release of the pedal such that the system can be released from the anti-lock mode. The pressure differential switch 44 is provided for detecting such a partial release in pressure by the operator.

When the system enters the anti-lock mode, the pressure in the line 24 is isolated by the isolation valve and the pressure in the line 18b will be greater than the pressure in the line 24 to close the differential switch 44 and set the DIFF flag true. After the DIFF flag has been set true, and the operator partially releases the brake pedal such that the pressure in line 18b falls below the pressure in the line 24, the pressure differential switch 44 will open and the DIFF flag will be false. Under these conditions, the pressure applied to the rear brakes via the line 24 is providing more braking than is desired by the operator, and thus it is desirable to open the isolation valve to reduce the pressure to the rear brakes. This is accomplished by the SWITCH CHECK subroutine which monitors the present status of the differential switch (DIFF) and compares it to the previous status (PDIFF) to determine whether the differential switch was at one time closed, but is now opened.

Referring to FIG. 5d, the SWITCH CHECK subroutine begins at a decision point to check the status of the DIFF flag. When the DIFF flag is true, indicating that the pressure differential switch 44 is closed and that the pressure in the line 18b is greater than the pressure in the line 24, the program enters a processing function which sets the PDIFF logic flag true, thus indicating that the pressure differential switch has switched from the off (open) state to the on (closed) state. Next, the program enters a decision point to check the status of the CNTRL flag. As previously mentioned, the CNTRL flag is set true once the system enters the anti-lock control mode. If the CNTRL flag is false, indicating that the system is not in the anti-lock mode, and the pressure differential switch 44 is closed, this indicates a situation wherein the isolation valve may be closed at a time when it should be open. At this point, the program branches to a fail mode wherein the anti-lock system is disabled and the control module 30 can light the brake warning light 48 to indicate a possible malfunction condition of the anti-lock system to the operator. If the CNTRL flag is true, the program can return to the main program.

As shown in FIG. 5d, if the DIFF flag is false, indicating that the pressure differential switch 44 is open, the program enters a decision point to determine whether the switch 44 had previously been closed (PDIFF=T), indicating the system was in the anti-lock mode. If the PDIFF flag is true, this indicates that the system no longer needs to be in the anti-lock mode and the program then enters a processing function to set the PDIFF flag to false and call the RESET1 subroutine. From this point, the program returns to the main program of FIG. 4. If the PDIFF flag is false, indicating that the pressure differential switch 44 was previously open, the subroutine can return to the main program.

The main program then enters a subroutine entitled FAILSAFE wherein various checking procedures can be performed by the control module to confirm proper operation of the associate sensor(s), wiring, etc. After executing the FAILSAFE subroutine, the main program of FIG. 4 enters a processing function to execute a subroutine entitled DECEL and illustrated in FIG. 5e.

Figure 5E:
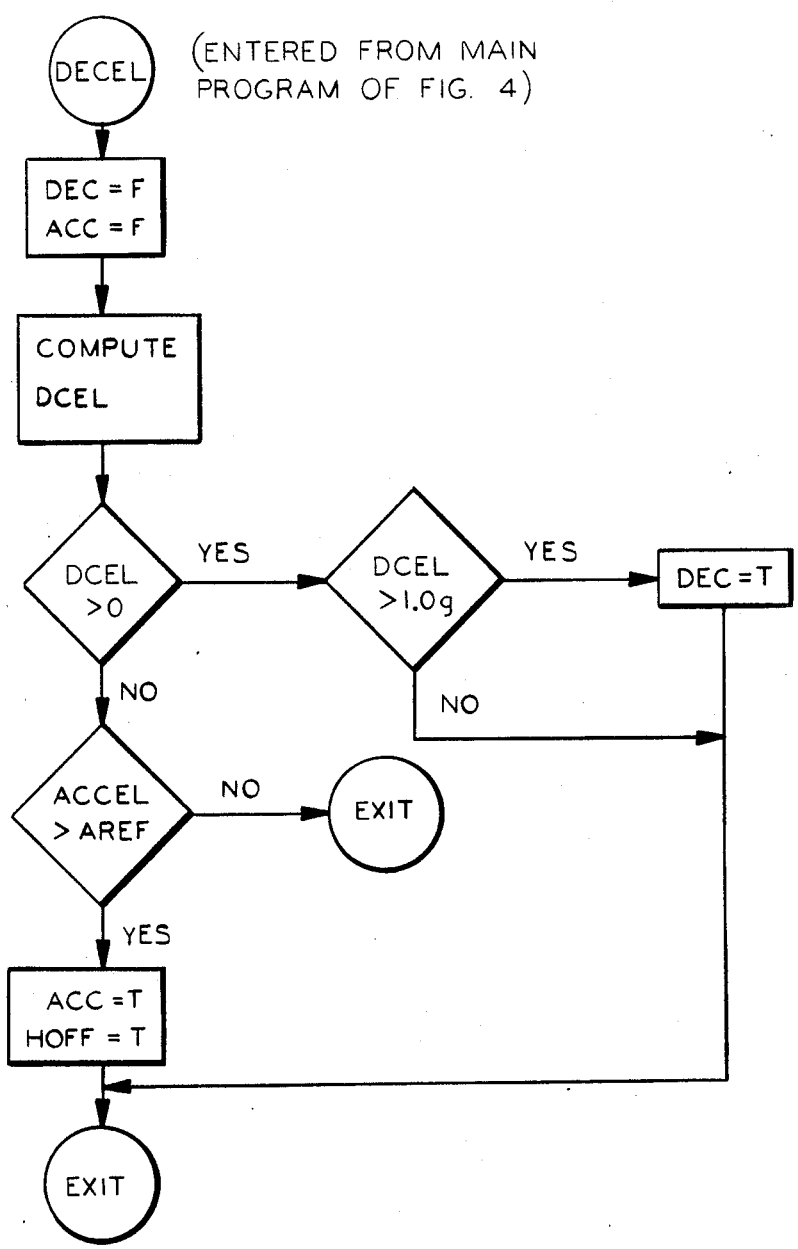

The DECEL subroutine is utilized to compute the current value of rear wheel deceleration (DCEL) and, in the event of spurious rear wheel acceleration, to set the HOFF logic flag true, indicating that the slip threshold has been increased for a predetermined time period. As shown in FIG. 5e, the program enters a processing function wherein the DEC and ACC logic flags are both set false. Next, the program enters a processing function to compute the current rear wheel deceleration (DCEL) by calculating the change in rear wheel velocity over a predetermined time period. If the computed deceleration (DCEL) is greater than zero, indicating that the rear wheels are decelerating, the program enters a decision point to check whether the current DCEL value is greater than a 1.0 g rate. If the answer is yes, the program enters a processing function to set the DEC logic flag true, thus indicating that the rear wheel deceleration is greater than 1.0 g. If the answer is no, the DECEL subroutine returns to the main program of FIG. 4.

In the event that the computed value for DCEL is less than or equal to zero, indicating that there is no rear wheel deceleration, the program enters a decision point to determine whether there is significant rear wheel acceleration. If the rear wheel acceleration (ACCEL) is not above a predetermined level (AREF), the program exits the DECEL subroutine and returns to the main program. If, however, the wheel acceleration is larger than the predetermined level AREF, the program enters a processing function to set the ACC logic flag to true, thus indicating that the rear wheel acceleration is above the AREF level, and also to set the HOFF flag to true, indicating that the slip threshold should be increased over the next predetermined time period. The DECEL subroutine then returns to the main program. At this time, the main program waits until the SKT timer flag is true, to permit the program to continue to the third section of the loop.

Figure 5F:
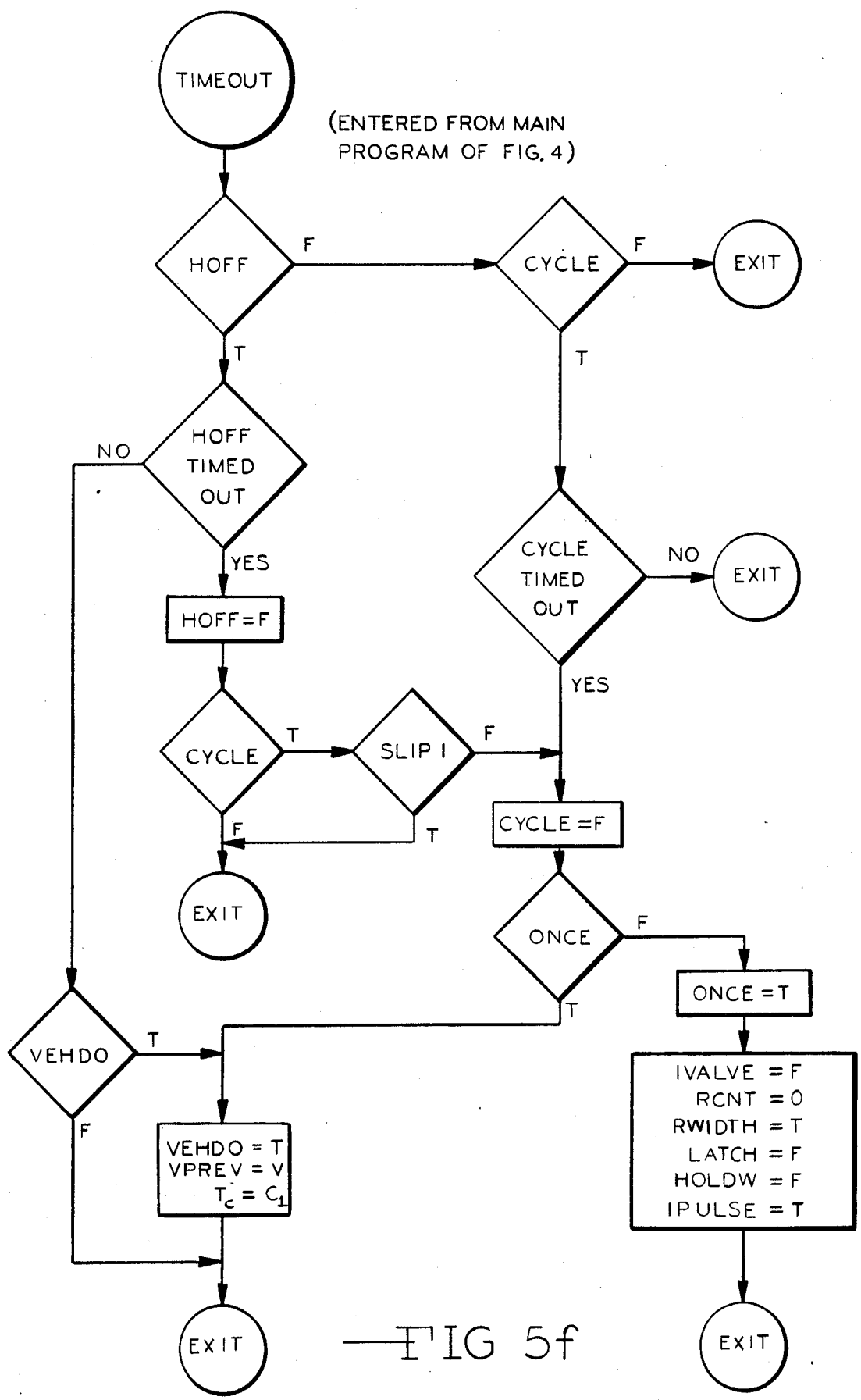

When the SKT flag is true, the program again enters a processing function which calls the WIDTH subroutine (FIG. 5b) to determine whether there are any dump pulses or reapply pulses to be terminated at this time. After the WIDTH subroutine has been called, the program enters a subroutine program entitled TIMEOUT which is shown in FIG. 5f. Basically, the TIMEOUT subroutine is designed to limit the total length of time during which either the HOFF logic flag or the CYCLE logic flag remains in a true state. The HOFF flag is set true when the slip threshold has been temporarily increased, while the CYCLE flag is set true once the system has entered the anti-lock mode and has dumped pressure.

Referring to FIG. 5f, the TIMEOUT subroutine is initiated by determining the status of the HOFF flag. If the HOFF flag is false, the program then checks the status of the CYCLE flag. If the CYCLE flag is false, the program returns to the main program. If the CYCLE flag is true, the program checks to see whether the CYCLE flag has timed out and, if so, enters a processing function to set the CYCLE flag false. If the CYCLE flag has not timed out, the program returns to the main program.

If the HOFF flag is true, the program enters a decision point to determine whether the HOFF flag has timed out. If the HOFF flag has not timed out, the TIMEOUT subroutine branches to a decision point to check the status of the VEHDO flag. If the VEHDO flag is true, indicating a new DVREF value (which will be discussed hereinafter with reference to FIG. 6d) is to be calculated, the program branches to a processing function to set VEHDO=T, VPREV=V and $T_c = C_1$. As will be discussed, these parameters are used in calculating the DVREF value. By resetting the parameters at this time, calculation of DVREF is delayed until the HOFF flag has timed out. If the VEHDO flag is false, the TIMEOUT subroutine is exited. Referring back to the decision point which checks if the HOFF flag has timed out, if the answer is yes, the program enters a processing function to set the HOFF flag to false and then enters a decision point to check the status of the CYCLE flag. If the CYCLE flag is true, and the SLIP1 flag is false, indicating that the rear wheel slip is below the threshold, the program will enter a processing function to terminate the cycle time period early by setting the CYCLE flag to false. If the CYCLE flag is false, or if the CYCLE flag is true and the SLIP1 flag is true, the program will return to the main program.

After the CYCLE flag has been set false, the program enters a decision point to check the status of the ONCE flag. The ONCE flag is utilized to cause the system to enter the pressure application mode after completion of the first wheel speed recovery cycle. It has been found that this ensures that the maximum required pressure is supplied to the rear brakes during the vehicle stop. The ONCE flag is initially set false by the RESET1 subroutine, and is then set true upon completion of the first wheel speed recovery cycle. The ONCE flag will then remain true for the completion of the vehicle stop.

As shown in FIG. 5f, if the ONCE flag is true, the subroutine branches to the processing function which initializes the parameters necessary for the calculation of the DVREF value. However, if the ONCE flag is false, the program first enters a processing function to set the ONCE flag true, and then enters a processing function which initializes parameters and sets certain logic flags required to place the system in the pressure application mode. More specifically, a reapply pulse count (RCNT) is set to zero, while a reapply pulse width (RWIDTH) is set to a predetermined time $(T_R)$. Also the IVALVE, LATCH, and HOLDW flags are set false, while the IPULSE flag is set true. These parameters and logic flags will be discussed in more detail hereinafter. The subroutine then returns to the main program.

Following the execution of the TIMEOUT subroutine, the main program enters a decision point to check the status of the PEDAL logic flag. When the PEDAL flag is false, indicating that the operator is no longer depressing the brake pedal, there is no need for the anti-lock control and the program enters a processing function which calls the RESET1 subroutine and then returns to the beginning of the loop. However, if the PEDAL flag is true, indicating that the operator still desires to brake the vehicle, the program enters a processing function to execute a subroutine entitled DPART which is shown in FIG. 5g.

Generally, the DPART subroutine is utilized to determine whether the difference (SLIP) between the computed speed ramp value (RAMP) and the actual wheel speed (V) exceeds a predetermined slip threshold. Depending on the status of the HOFF logic flag, which indicates that the rear wheel was recently subjected to spurious acceleration, the computed slip value is compared with either a first slip threshold $(S_1)$ if the HOFF flag is false, or is compared with a higher slip threshold (S$_2$) if the HOFF flag is true.

Figure 5G:
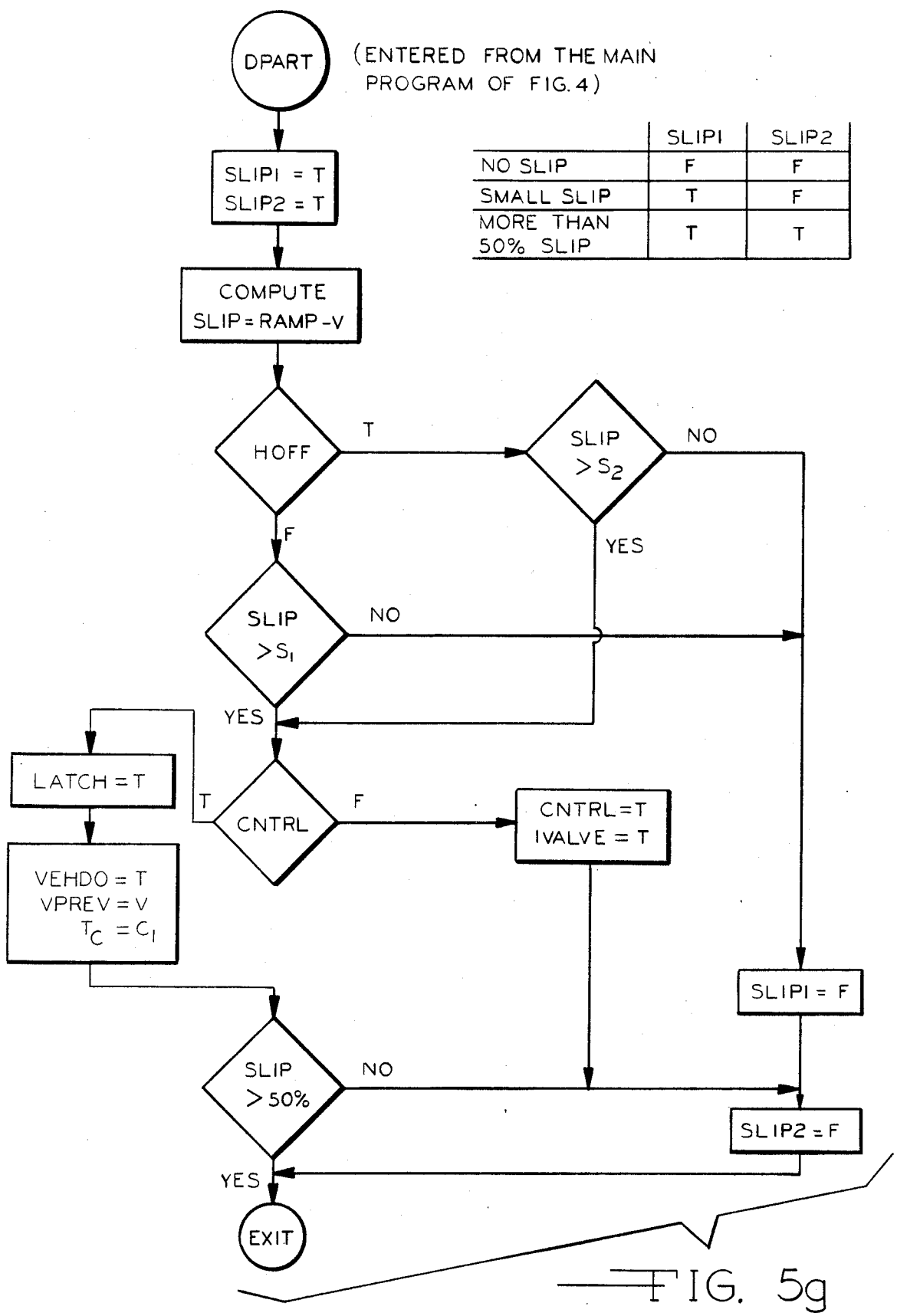

As shown in FIG. 5g, the DPART subroutine begins with a processing function which sets the SLIP1 and SLIP2 logic flags to true. The definitions of the SLIP1 and SLIP2 logic flags are set forth in the following table.

| SLIP1 | SLIP2 | SLIP CONDITION |
|---|---|---|
| F | F | No slip (SLIP<S$_1$ or S$_2$) |
| T | F | Small slip (S$_1$ or S$_2$ ≦ SLIP ≦ RAMP/2) |
| T | T | More than 50% slip (SLIP > RAMP/2) |

Next, the program enters a processing function which computes the SLIP value by subtracting the current rear wheel speed (V) from the computed ramp value (RAMP). Next, if the HOFF flag is false, indicating that the rear wheels were not recently subjected to spurious acceleration, the SLIP value is compared with the slip threshold S$_1$. If the SLIP value is not greater than the threshold S$_1$, the program branches to execute a pair of processing functions wherein the SLIP1 and SLIP2 logic flags are set false before returning to the main program. This indicates that the current value of SLIP does not exceed the predetermined slip threshold. When the SLIP value is greater than S$_1$, the program branches to a decision point which checks the status of the CNTRL flag.

Referring back to the decision point which checks the status of the HOFF flag, if the HOFF flag is true, the program branches to a decision point which compares the computed SLIP value with a larger slip threshold S$_2$. When the SLIP value is not greater than S$_2$, the program branches to the processing functions wherein the logic flags SLIP1 and SLIP2 are set false. If the computed SLIP value is greater than S$_2$, the program branches to a decision point which checks the status of the CNTRL logic flag.

In the event the CNTRL flag is false, which indicates that the calculated SLIP value is based on the initial low deceleration rate (e.g. 0.67 g) RAMP value, the program enters a processing function which sets the CNTRL flag true, and closes the isolation valve by setting the IVALVE flag true. Next, the program enters a processing function wherein the SLIP2 logic flag is set false before the subroutine returns to the main program of FIG. 4 with the SLIP1 flag set true.

If the CNTRL flag is true, indicating that the computed SLIP value is based on the higher deceleration rate (e.g. 1.0 g) RAMP value, the system is latched in the anti-lock mode by setting the LATCH flag true. The program then enters a processing function which sets the VEHDO flag true, indicating a new DVREF value is to be calculated, and setting the parameters VPREV=V and T$_c$=C$_1$. Next, the program enters a decision point to check whether the computed slip value represents greater than 50% slip (RAMP/2). If there is less than 50% slip, the program branches to set the SLIP2 logic flag to false. When there is greater than 50% slip, the program returns to the main program with both the logic flags SLIP1 and SLIP2 set true.

Figure 5H:
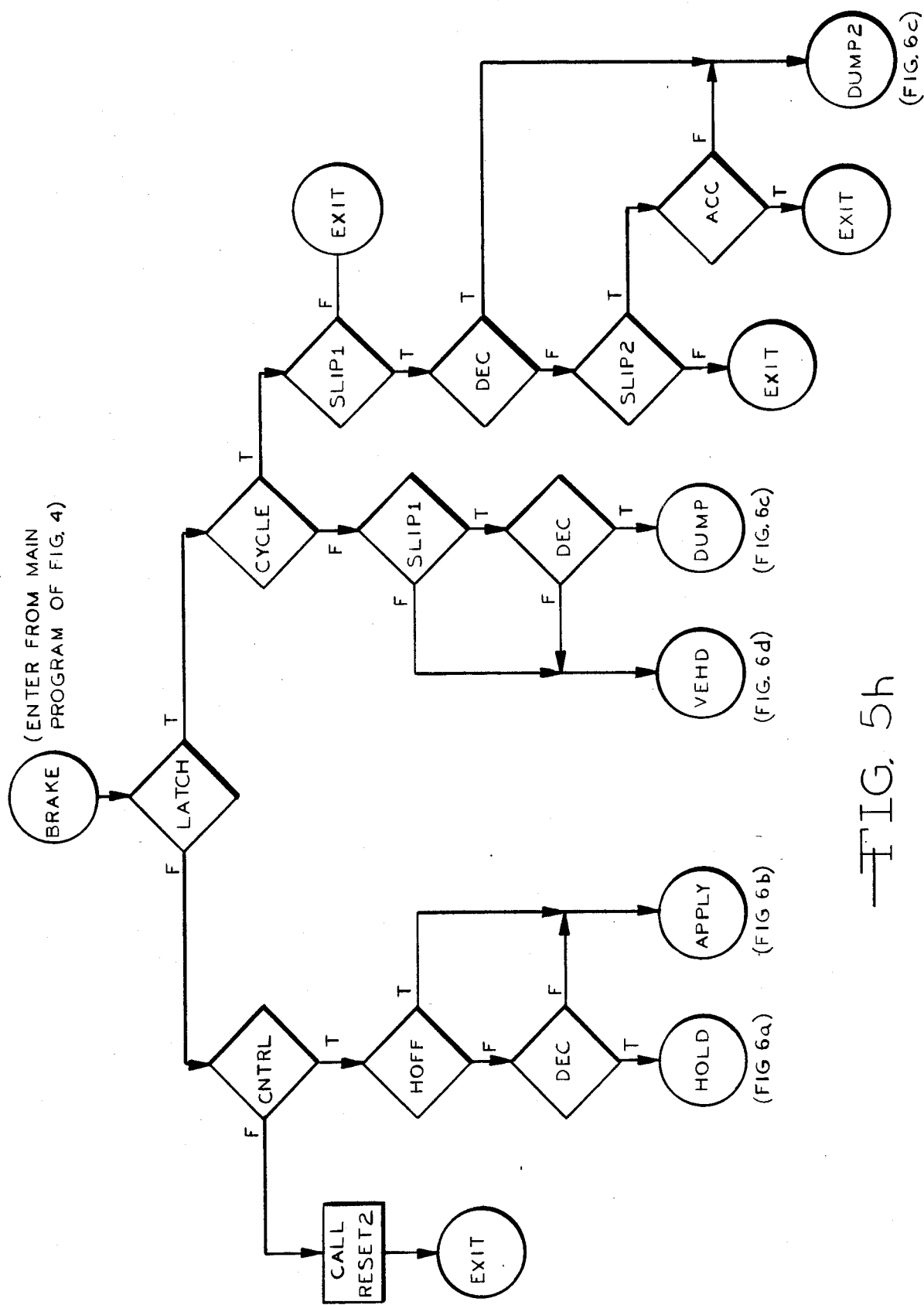

After the DPART subroutine is executed, the program enters a processing function to execute a subroutine shown in FIG. 5h and entitled BRAKE. The BRAKE subroutine is basically designed to select the particular operating mode which the anti-lock system should be in, depending on the status of the various logic flags. Referring to FIG. 5h, the BRAKE subroutine is initiated by determining the status of the LATCH logic flag. As previously indicated, the LATCH logic flag indicates that the system is in the anti-lock mode and that the isolation valve is being held closed closed continuously (LATCH=F) and the CNTRL flag is false, the program enters the RESET1 subroutine at the RESET2 point to return the system to or maintain the system in the normal braking mode. If the CNTRL flag is true, the subroutine then enters a decision point to check the status of the HOFF logic flag.

Figure 6A:
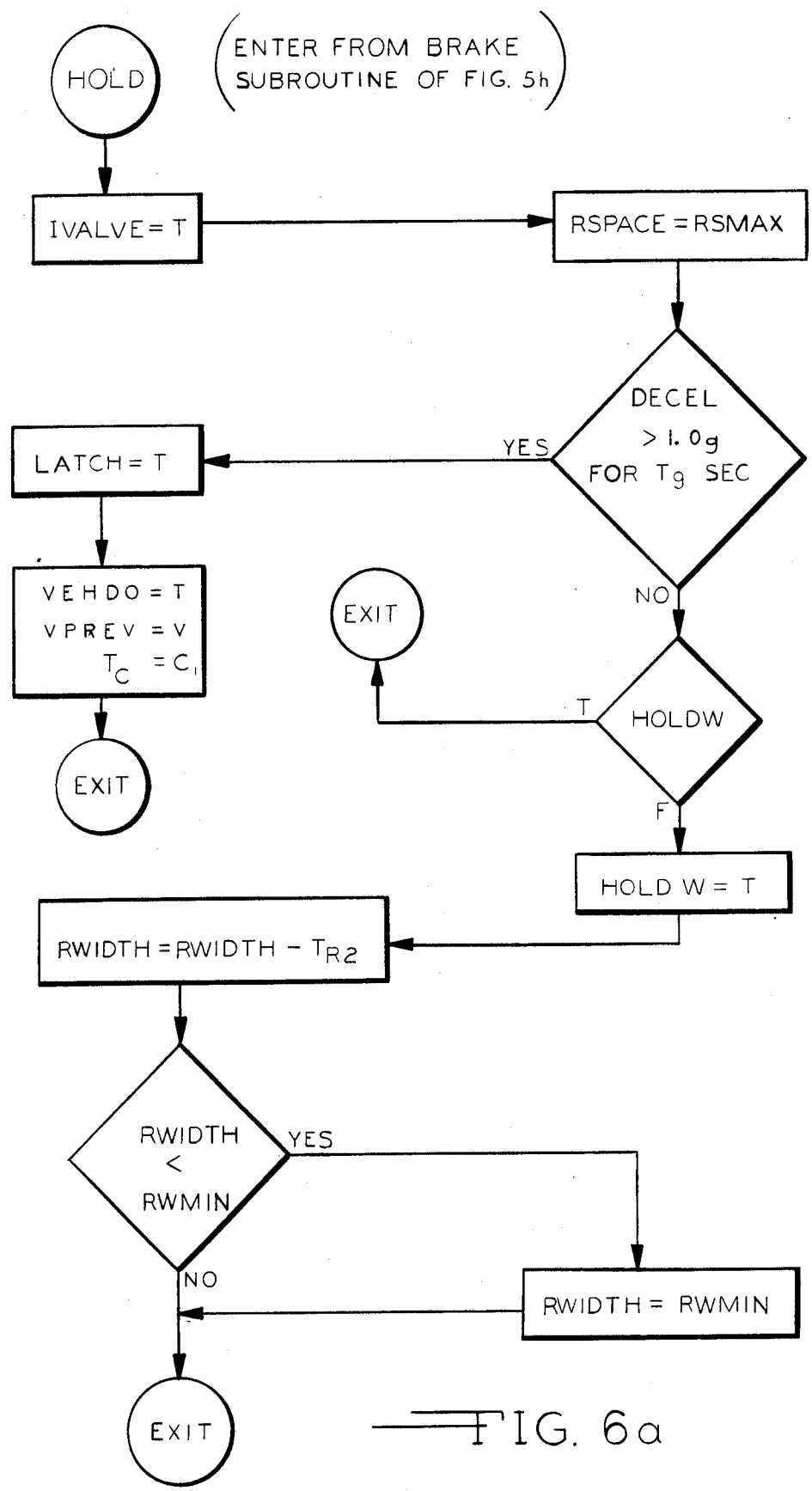
Figure 6B:
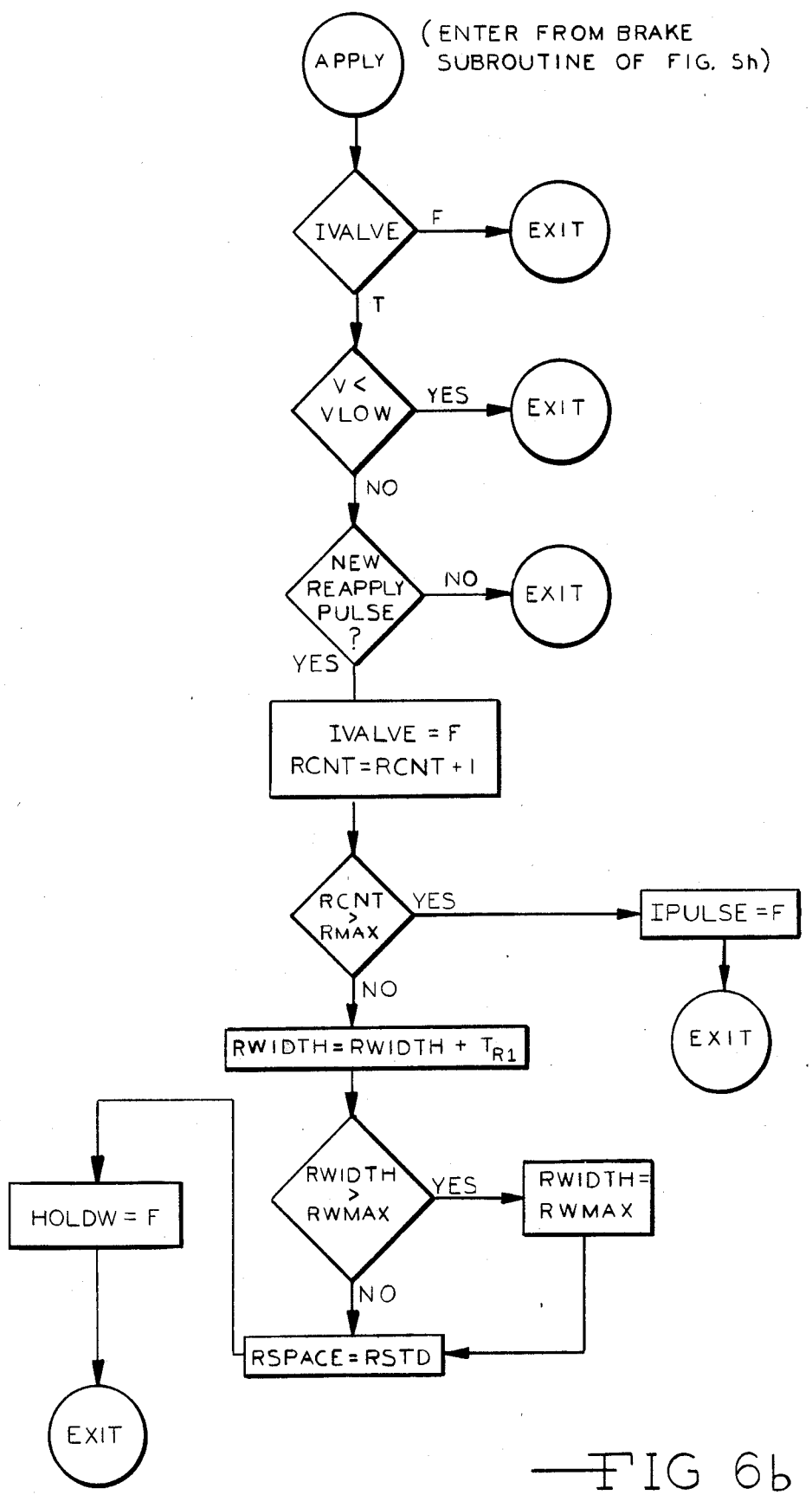

If the HOFF logic flag is true, the program branches to a subroutine entitled APPLY and shown in FIG. 6b. The APPLY subroutine, which will be discussed in more detail hereinafter, is utilized to increase the pressure in the rear brake line 24 after the isolation valve has been closed, by selectively opening the isolation valve for predetermined time periods to enable the higher pressure fluid in the line 18b to increase the pressure in the line 24. If the HOFF flag is false, the program enters a decision point to check the status of the DEC flag. If the DEC flag is false, indicating that the rear wheels are not decelerating at an excessive rate (e.g., 1.0 g), the program branches to the APPLY subroutine. However, if the DEC flag is true, indicating the rear wheels are decelerating at an excessive rate, the program branches to a subroutine entitled HOLD and shown in FIG. 6a. The HOLD subroutine, which will be discussed in more detail hereinafter, is designed to maintain the isolation valve in a closed state to hold the pressure in the line 24 at its present value until such time that the rear wheel deceleration changes to indicate that either the pressure in the line 24 must be increased by selectively opening the isolation valve or decreased by selectively opening the dump valve.

If, when the BRAKE subroutine is entered, the LATCH flag is true, indicating the system is latched in the anti-lock mode, the program branches to check the status of the CYCLE flag. As will be discussed, the CYCLE flag is initially set false, and is set true once the system has been latched into the anti-lock mode and has begun to dump pressure to reduce the pressure in the rear brake line 24. If the system has not previously dumped pressure, the system branches to check the status of the SLIP1 flag, which is set true in the event the slip threshold has been exceeded. If the slip threshold has been exceeded (SLIP1 =T), the program then branches to a decision point to check whether there is excessive rear wheel deceleration at this time. If the DEC flag is true, indicating excessive rear wheel deceleration, the program enters a subroutine entitled DUMP and shown in FIG. 6c. As will be discussed, the DUMP subroutine is designed to selectively open the dump valve for predetermined time periods to reduce the pressure in the line 24 to a level which does not cause excessive wheel slip.

Figure 6C:
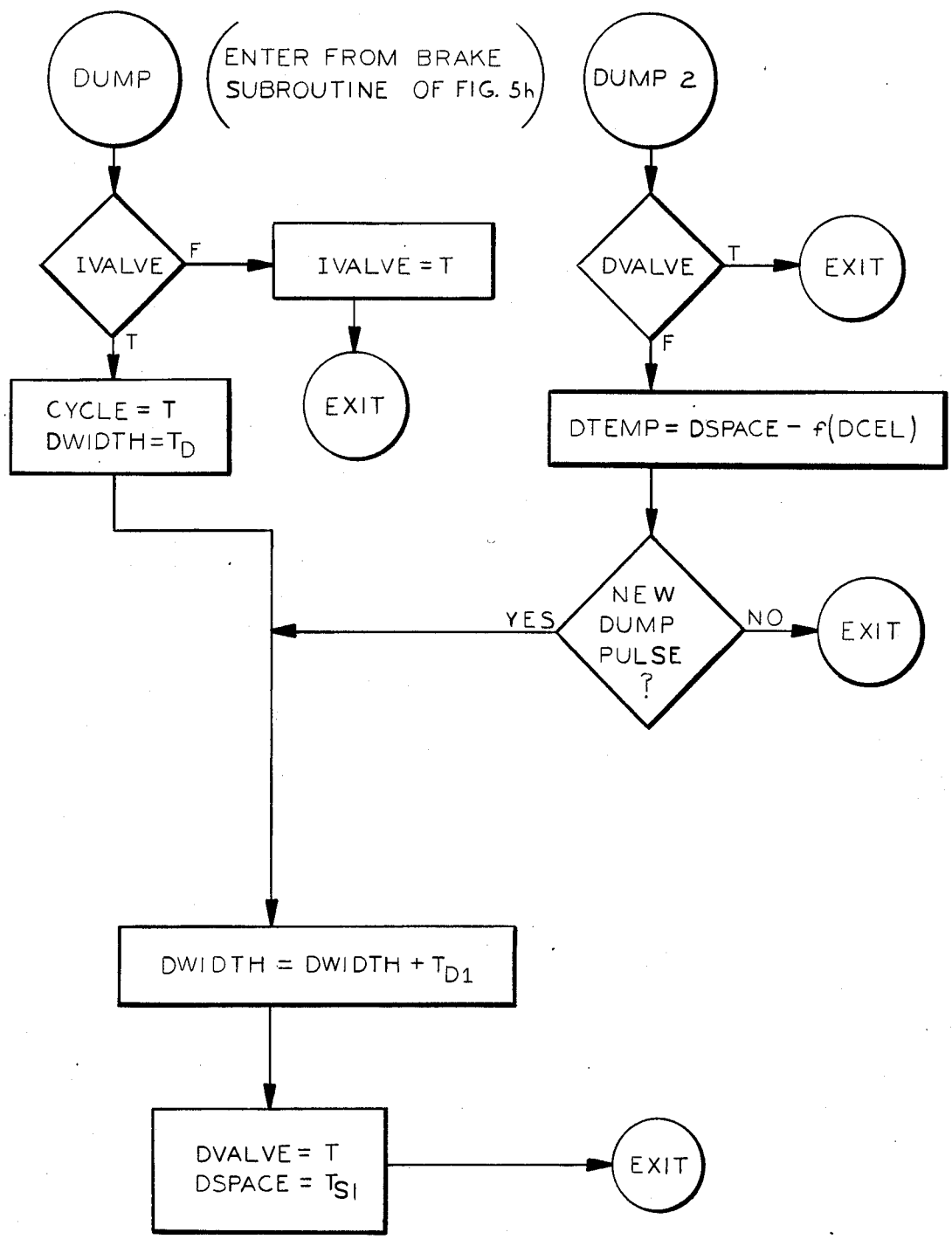
Figure 6D:
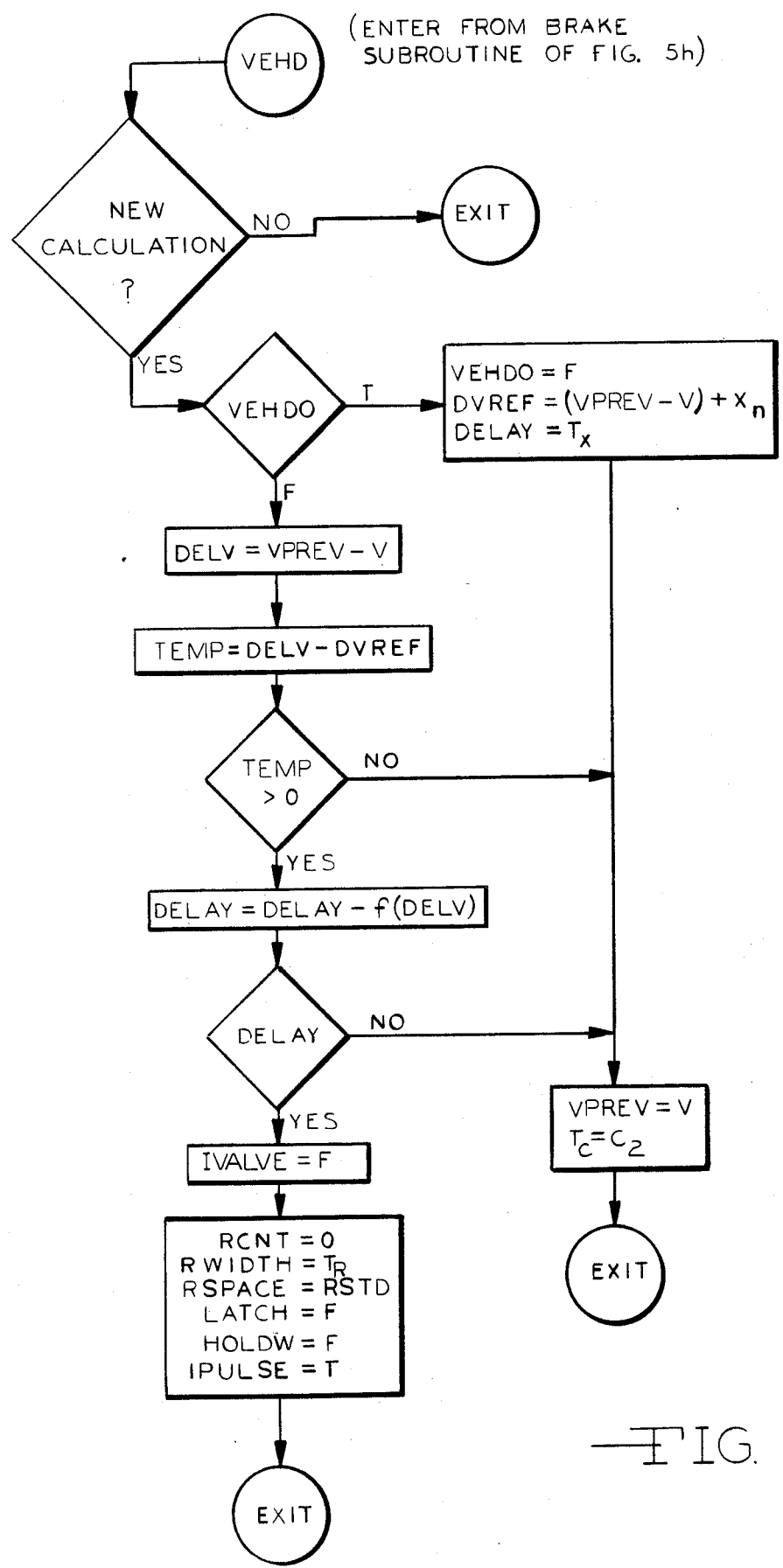

If the present rear wheel slip does not exceed the threshold level (SLIP1 =F), or if SLIP1 =T and there is not excessive rear wheel deceleration (DEC =F), the program branches to a subroutine entitled VEHD and shown in Figure 6d. As will be discussed, the VEHD subroutine is a very important feature of the present anti-lock system, and functions to monitor increases in rear wheel deceleration after the system has entered the anti-lock mode and a wheel slip condition has been corrected . When there is no wheel slip and the rear wheel deceleration increases, this indicates that the vehicle may have traveled from a low mu surface to a high mu surface, and the system can be directed to enter the APPLY subroutine wherein the pressure applied to the rear brakes is selectively increased.

If, when the BRAKE subroutine is entered, both the LATCH and CYCLE flags are true, indicating that the system is latched in the anti-lock mode and is currently in the process of dumping pressure to correct excessive wheel slip, the program enters a decision point to determine the status of the SLIP1 flag. If the SLIP1 flag is false, indicating that the wheel slip is below the threshold, the program returns to the main program. However, if there is wheel slip (SLIP1=T), the program checks the status of the DEC flag to determine whether there is excessive rear wheel. deceleration (DEC=T). If there is excessive rear wheel deceleration, the program branches to the DUMP2 location in the DUMP subroutine of FIG. 6c. When the rear wheels are not decelerating at an excessive rate (DEC=F), the program checks the status of the SLIP2 flag. If the SLIP2 flag is true, indicating that there is more than 50% wheel slip, the program checks the ACC logic flag to determine whether the rear wheel acceleration is above the predetermined reference value (AREF), as discussed with reference to FIG. 5e. If the rear wheel acceleration is below AREF (ACC=F), the program branches to the DUMP2 point of the DUMP subroutine of FIG. 6c. If the SLIP2 flag is false, or the ACC flag is true, the program returns to the main program.

The HOLD subroutine, which is entered from the BRAKE subroutine of FIG. 5h, is illustrated in FIG. 6a. As previously mentioned, the HOLD subroutine functions to close the isolation valve 22 to hold pressure in the line 24. Initially, the HOLD subroutine enters a processing function wherein the logic flag IVALVE is set true, thus closing the isolation valve 22. Next, the program enters a processing function wherein the initial spacing between the reapply pulses (RSPACE) is set equal to a predetermined maximum spacing, represented by the term RSMAX. Next, the program enters a decision point to check the length of time the rear wheel deceleration has exceeded 1.0 g. If the rear wheel deceleration has exceeded 1 g for more than $T_g$ seconds (for example, 50 msec.), the program branches to a processing function which sets the LATCH logic flag to true, thus latching the system in the anti-lock mode. The program then enters a processing function which sets the VEHDO flag true, indicating a new DVREF value is to be calculated, and setting the parameters VPREV=V and $T_c=C_1$, prior to exiting the HOLD subroutine.

However, if the wheel deceleration has not exceeded 1.0 g for the time period $T_g$, the program enters a decision point to check the status of the HOLDW logic flag. The logic flag HOLDW is set false each time a reapply pulse is generated such that the portion of the HOLD subroutine following the HOLDW decision point is only entered once for each reapply pulse generated. When the HOLDW flag is true, the program exits the HOLD subroutine and returns to the main program. However, if the HOLDW logic flag is false, the program enters a processing function to set the HOLDW flag true, and then enters a processing function which reduces the width of the next reapply pulse by setting the pulse width (RWIDTH) equal to the previous value minus a predetermined time period $T_{R2}$. The pulse width RWIDTH is initially set equal to $T_R$ during the RESET1 subroutine (FIG. 5a). The program then enters a decision point to check whether the new reapply pulse width RWIDTH is less than a predetermined minimum pulse width (RWMIN). If the RWIDTH value is less than RWMIN, the program enters a processing function to set the RWIDTH value equal to the RWMIN value before exiting the HOLD subroutine.

Referring to FIG. 6b, there is shown the APPLY subroutine which is entered from the BRAKE subroutine of FIG. 5h. As previously mentioned, after the isolation valve 22 has been closed to hold pressure in the line 24, the APPLY subroutine is entered under certain conditions to temporarily open the isolation valve 22 to selectively increase pressure in the line 24. The APPLY subroutine is initiated by entering a decision point to determine the status of the IVALVE logic flag. If the IVALVE flag is false, indicating the isolation valve is open, it is not necessary to execute the APPLY subroutine at this time and the subroutine returns to the main program of FIG. 4. However, if the IVALVE logic flag is true, indicating the isolation valve is closed, the program enters a decision point to determine whether the present rear wheel speed (V) is less than a predetermined minimum (VLOW). If this is the case, the program exits the APPLY subroutine and returns to the main program, since it is not desirable to reapply pressure when the vehicle speed is below a predetermined minimum such as four miles per hour, for example.

However, if the rear wheel speed is above the predetermined minimum VLOW, the program enters a decision point to determine whether, based on the present reapply pulse spacing RSPACE and the termination of the last reapply pulse, a new reapply pulse should be generated at this time. If no reapply pulse should be generated, the program exits the APPLY subroutine. If a new reapply pulse should be initiated at this time, the subroutine enters a processing function wherein the IVALVE logic flag is set false to open the isolation valve. Also, a variable RCNT, which represents the total number of reapply pulses generated and is set equal to zero by the RESET2 subroutine, is incremented by one.

Next, a decision point is entered to see whether the total number of reapply pulses which have been generated (RCNT) has exceeded a predetermined maximum (RMAX). If so, the program enters a processing function wherein the IPULSE flag is set equal to false to permanently open the isolation valve until another wheel speed departure is detected. However, if the total number of reapply pulses has not exceeded the maximum number (RMAX), the program enters a processing function wherein the reapply pulse width (RWIDTH) is increased by a predetermined time period $T_{R1}$, which is typically one-half the time period $T_{R2}$ which is subtracted from the time RWIDTH in the HOLD subroutine. Thus, the reapply pulse width RWIDTH is initially set equal to $T_R$ by the RESET2 subroutine, and is then decreased by an amount $T_{R2}$ when the program enters the HOLD subroutine and the HOLDW flag is false, and is increased by an amount $T_{R1}$ when the program enters the APPLY subroutine. The program then enters a decision point to check whether the width RWIDTH is greater than a predetermined maximum width RWMAX. If so, the program enters a processing function to set the time RWIDTH equal to RWMAX. The program then enters a processing function to set the reapply pulse spacing RSPACE equal a standard value RSTD, which is less than the RSMAX value to which RSPACE is set at the beginning of the HOLD subroutine (FIG. 6a). Next, before exiting the APPLY subroutine, the program enters a processing function to set the HOLDW flag false.

When it is necessary to temporarily open the dump valve after the isolation valve has been closed to reduce the pressure in the rear brake line 24, the BRAKE subroutine of FIG. 5h enters the DUMP subroutine illustrated in FIG. 6c. The DUMP subroutine is entered at the DUMP point for the first dump pulse to be generated during a given wheel speed departure cycle, and is subsequently entered at the DUMP2 point for subsequent dump pulses. As shown in FIG. 6c, the DUMP subroutine is initiated by entering a decision point to check the status of the IVALVE flag. If the IVALVE flag is false, indicating the isolation valve is open, the program branches to a processing function to set the IVALVE flag true and close the isolation valve before exiting the subroutine. When the DUMP subroutine is entered and the IVALVE flag is true, the program enters a processing function to set the CYCLE flag true, and to set the initial dump pulse width (DWIDTH) equal to a predetermined time period ($T_D$).

After the above values have been set, the program enters a processing function wherein the dump pulse width (DWIDTH) is incremented by a predetermined time period $T_{D1}$. Next, the program enters a processing function wherein the logic flag DVALVE is set true, to open the dump valve, and the initial spacing between successive dump pulses is set equal to the time period $T_{S1}$. The program then returns to the main program.

In the event it is necessary to generate a second dump pulse during a given wheel speed departure cycle, the program will enter the DUMP subroutine of FIG. 6c at the DUMP2 point. The program then enters a decision point which checks to see whether the DVALVE logic flag is true or false. If the logic flag DVALVE is true, indicating that the dump valve is presently open, there is no need to proceed further at this point through the DUMP subroutine and the subroutine therefore returns to the main program. However, if the DVALVE logic flag is false, indicating that the dump valve is closed, the program enters a processing function wherein a temporary dump pulse spacing (DTEMP) is computed by decreasing the initial dump pulse spacing (DSPACE) by an amount which is a function of the deceleration value DCEL. As previously mentioned, the deceleration value DCEL was calculated during the DECEL subroutine of FIG. 5e. Typically, the larger the deceleration rate DCEL, the larger the value of f(DCEL), and thus the smaller is the spacing between adjacent dump pulses. After the temporary dump pulse spacing DTEMP is calculated, the program enters a decision point to determine whether, at this time, the time period DTEMP has transpired since the termination of the last dump pulse. If a new dump pulse is to be generated, the program branches to the processing function to set the dump pulse width DWIDTH, and then proceeds through the remainder of the DUMP subroutine. If no new dump pulse is to be generated at this time, the program returns to the main program of FIG. 4.

With the present invention, once the LATCH flag is set true and the system is latched in the anti-lock mode, the system generally functions to hold a predetermined pressure in the rear brake line 24 and, if significant wheel slippage is still detected, pressure is selectively dumped from the line 24 to reduce the slippage. However, due to the possibility that, during a controlled stop, the vehicle may travel from a relatively low mu surface to a higher mu surface, it is not desirable in these instances that the system maintain a relatively constant pressure to the rear brakes. Under these conditions, it would be desirable to further increase the pressure. In order to detect such a change in road surface conditions, the subroutine VEHD of FIG. 6d is utilized to detect when the vehicle travels onto a higher friction surface during a controlled stop. Since, under these conditions, the uncontrolled braked front wheels will provide increased braking when the vehicle travels onto a higher mu surface, the vehicle will begin to decelerate at a greater rate. The VEHD subroutine is designed to detect an increase in deceleration of a vehicle over a predetermined amount, and to cause the program to enter the APPLY subroutine of FIG. 6b to further increase the rear brake pressure.

As shown in FIG. 6d, the VEHD subroutine is initiated by entering a decision point to determine whether a new vehicle deceleration calculation is to be made at this time. In order to determine this, the program checks whether the time period $T_c$ has expired. The time period $T_c$ has been either set to (1) a time $C_1$ if an initial DVREF calculation is to be made, or (2) a time $C_2$ if a subsequent calculation (DELV) is to be made for comparison with the DVREF value. Generally the time $C_2$ is less than the time $C_1$ by a predetermined amount. As will be discussed, this enables a direct comparison between the reference DVREF and the present value DELV. If a new calculation is to be made, the program enters a decision point to check the status of the VEHDO logic flag. The VEHDO logic flag is set true when it is necessary to calculate an initial deceleration reference rate (DVREF) to which subsequent deceleration rate calculations can be compared. If the VEHDO flag is true, the subroutine enters a processing function wherein the VEHDO flag is set false, and then the deceleration reference rate (DVREF) is calculated by determining the decrease in velocity (VPREV−V) which has occurred over the last predetermined time period $T_c$ (which is equal to the time $C_1$), and then adding a predetermined number ($X_N$) to compensate for any associated system noise. Also, a time period DELAY, which is used to delay entering the pressure application mode when the present vehicle deceleration (DELV) is sufficiently low, is initially set equal to the time $T_x$. The program then enters a processing function to set VPREV=V and the time $T_c$ equal to $C_2$. From this point, the program exits the VEHD subroutine.

If a new calculation is to be performed and the VEHDO flag is false, the program enters a processing function to compute a value (DELV) representative of the current deceleration rate of the vehicle over the last predetermined time period $T_c$ (which at this time is equal to the time $C_2$). Next, the program calculates the difference (TEMP) between the present deceleration rate (DELV) and the previously calculated reference value (DVREF). Since the time period $C_1$ over which the value DVREF is calculated is greater than the time period $C_2$, a positive difference indicates that the current rate of vehicle deceleration is greater than the reference value DVREF by at least a factor of $C_1/C_2$. If the TEMP value is not greater than zero, indicating that the vehicle deceleration rate has not increased significantly, the program exits the VEHD subroutine after setting VPREV to V and $T_c$ to $C_2$. However, if this difference (TEMP) is greater than zero, the program enters a processing function wherein the time period DELAY is decreased by a value which is a function of the current vehicle deceleration DELV. Typically, the higher the DELV value, the higher the value of f(DELV).

Next, the program enters a decision point to determine whether the DELAY time period has expired. If the DELAY time period has not yet expired, this indicates that the increase in vehicle deceleration is relatively low, and it is thus desirable to delay opening the isolation valve and entering the pressure application mode. However, if the DELAY time period has expired, the program enters a processing function to set the IVALVE logic flag to false to open the isolation valve. Next, the program enters a processing function to set the parameters and logic flags required to cause the system to enter the pressure application mode. In particular, the processing function sets the variable RCNT (reapply pulse count) to zero, the variable RWIDTH (reapply pulse width) to $T_R$, and the variable RSPACE (reapply pulse spacing) to RSTD. Also, the logic flags LATCH and HOLDW are set false and the logic flag IPULSE is set true such that, when the program cycles through the BRAKE subroutine of FIG. 5h, the program will branch to the portion of the program where either the HOLD or APPLY subroutine of FIGS. 6a and 6b can be entered.

After the BRAKE subroutine and, if called, either the HOLD, DUMP, APPLY or VEHD subroutine have been executed, the program branches to the beginning of the loop (FIG. 4) at which point the status of the SKT timer flag is again checked. The program then will again cycle through the various operating instructions as set forth above.

In accordance with the provisions of the patent statutes, the principles and mode of operation of the present invention have been illustrated and described in what is considered its preferred embodiment. However, it should be understood that the present invention can be practiced otherwise than as specifically illustrated and described without departing from its spirit or scope as defined by the following claims.

What is claimed is:

1. In a wheeled vehicle having means for supplying pressurized brake fluid to actuate the associated wheel brakes of the vehicle, a brake control system for controlling the application of pressurized brake fluid to at least one selected wheel brake to control the braking of the associated wheel, said control system comprising:

a normally open isolation valve means connected between the supply means and the selected wheel brake;

a normally closed dump valve means connected between the selected wheel brake and a fluid reservoir; and control means connected to operate said isolation valve means and said dump valve means, said control means including means for detecting a wheel lock-up condition of the associated wheel and means for sensing the deceleration of the associated wheel, said control means operable to close said isolation valve means to hold the fluid pressure to the selected wheel brake at a relatively constant level after said wheel lock-up condition of the associated wheel is detected, said control means operable to selectively open said dump valve means after said wheel lock-up condition has been detected to enable fluid to flow into said fluid reservoir to selectively reduce fluid pressure to the selected wheel brake and correct the lock-up condition of the associated wheel, said control means further operable to selectively open said isolation value to selectively increase pressure to the wheel brake after said wheel lock-up condition has been corrected and the rate of change of deceleration of the associated wheel increases by a predetermined amount, said control means operable to selectively control the application of increased pressure to the associated wheel brake to prevent further lock-up of the associated wheel.

2. The brake control system according to claim 1 wherein said control means includes means for generating a slip signal when said wheel lock-up condition is detected, and means responsive to said slip signal for closing said isolation valve means.

3. The brake control system according to claim 2 wherein said control means includes means coupled to monitor the speed of the associated wheel for generating a wheel speed signal, means responsive to said wheel speed signal for generating a speed ramp signal representing the speed the vehicle would travel if decelerated at a first predetermined rate, and means for generating said slip signal when the difference between said speed ramp signal and said wheel speed signal exceeds a predetermined slip threshold.

4. The brake control system according to claim 3 wherein said speed ramp signal is a first speed ramp signal and said slip signal is a first slip signal, and wherein said control means includes means responsive to said wheel speed signal for generating a second speed ramp signal representing the speed the vehicle would travel if decelerated at a second predetermined rate, means for generating a second slip signal when the difference between said second speed ramp signal and said wheel speed signal exceeds said predetermined slip threshold, and means responsive to said second slip signal for selectively opening said dump value means.

5. The brake control system according to claim 4 wherein said second predetermined rate is greater than said first predetermined rate.

6. The brake control system according to claim 3 wherein said control means includes means for increasing said slip threshold for a predetermined time period when wheel speed oscillations are detected.

7. The brake control system according to claim 3 wherein said control means includes means for generating a no slip signal when said wheel lock-up condition has been corrected.

8. The brake control system according to claim 7 wherein said control means includes means responsive to said no slip signal and an increase in the rate of wheel deceleration above said predetermined amount for generating an apply signal to selectively open said isolation valve to increase pressure to the selected wheel brake.

9. The brake control system according to claim 7 wherein said control means includes means responsive to said slip signal for generating a hold/apply signal, and means responsive to said no slip signal and said hold/apply signal for generating an apply signal when the associated wheel deceleration is below a predetermined amount to open said isolation valve means to selectively increase pressure to the selected wheel brake.

10. The brake control system according to claim 7 wherein said means for generatinig said no slip signal generates said no slip signal when the difference between said speed ramp signal and said wheel speed signal is less than said predetermined slip threshold.

11. The brake control system according to claim 8 wherein said apply signal includes a series of apply pulses each having a width representing the time the isolation valve means remains open.

12. The brake control system according to claim 11 including emans for varying the width of said apply pulses.

13. The brake control system according to claim 11 including means for varying the spacing between successive apply pulses.

14. The brake control system according to claim 3 wherein said control means includes means for generating a large slip signal when the difference between said speed ramp signal and said wheel speed signal is greater than said slip threshold by a predetermined amount, and means responsive to said large slip signal when the associated wheel is not accelerating for opening said dump valve means to reduce pressure to the selected wheel brake.

15. The brake control system according to claim 2 wherein said predetermined amount is a first predetermined amount and wherein said control means includes means responsive to said slip signal when the associated wheel deceleration exceeds a second predetermined amount for generating a dump signal to open said dump valve means to selectively reduce pressure to the selected wheel brake.

16. The brake control system according to claim 15 wherein said dump signal includes a series of dump pulses each having a width representing the time the dump valve means remains open.

17. The brake control system according to claim 12 including means for varying the width of said dump pulses.

18. The brake control system according to claim 16 including means for varying the spacing between successive dump pulses.

19. The brake control system according to claim 1 wherein said isolation valve means includes an inlet coupled to the supply means and an outlet coupled to the selected wheel brake, said control means including means for monitoring the differential pressure across said isolation valve means and for generating a pressure differential signal when said isolation valve means is closed and the pressure at said outlet is greater than the pressure at said inlet, said control means responsive to said pressure differential signal for opening said isolation valve means.

20. The brake control system according to claim 1 wherein said fluid reservoir is contained in the master cylinder.

21. The brake control system according to claim 1 wherein said fluid reservoir is a fluid accumulator which includes means for maintaining fluid stored therein at a predetermined elevated pressure relative to a non-actuated fluid pressure supplied to the selected wheel brake.

22. The brake control system according to claim 2 wherein said control means includes means for generating a no slip signal when said wheel lock-up condition has been corrected.

23. The brake control system according to claim 22 wherein said control means includes means responsive to said no slip signal and an increase in the rate of wheel deceleration above said first predetermined amount for generating an apply signal to selectively open said isolation valve to increase pressure to the selected wheel brake.

24. The brake control system according to claim 23 wherein said apply signal includes a series of apply pulses each having a width representing the time the isolation valve means reamains open.

25. The brake control system according to claim 24 including means for varying the width of said apply pulses.

26. The brake control system according to claim 24 including means for varying the spacing between successive apply pulses.

27. The brake control system according to claim 22 wherein said means for generating said no slip signal generates said no slip signal when the difference between said speed ramp signal and said wheel speed signal is less than said predetermined slip threshold.

28. The brake control system according to claim 22 wherein said control means includes means responsive to said slip signal for generating a hold/apply signal, and means responsive to said no slip signal and said hold/apply signal for generating an apply signal when the associated wheel deceleration is below a predetermined amount to open said isolation valve means to selectively increase pressure to the selected wheel brake.

29. A brake control system for a wheeled vehicle having first and second sets of wheels provided with first and second sets of wheel brakes, a brake pedal operable by the vehicle operator, a master cylinder connected with and actuated by the brake pedal to supply pressurized brake fluid in a first brake pressurizing circuit to actuate the first set of wheel brakes and to supply pressurized brake fluid in a second brake pressurizing circut to actuate the second set of wheel brakes, said second brake pressurizing circuit comprising;
  a normally open isolation valve means connected between the master cylinder and the seond set of wheel brakes;
  a normally closed dump valve means oonnected between the second set of wheel brakes and a fluid reservoir; and
  control means connected to operate said isolation valve means and said dump valve means, said control means including means for detecting a wheel lock-up condition of the second set of wheels and means for sensing the deceleration of the second set of wheels, said control means operable ot close said isolation valve to hold the fluid pressure to the second set of wheel brakes at a relatively constant level after said wheel lock-up conidition of the second set of wheels is detected, said control means operable to selectively open said dump valve means after said wheel lock-up condition has been detected to enable fluid to flow into said fluid reservoir to selectively reduce fluid pressure to the second set of wheel brakes and correct the lock-up condition of the associated wheel, said control means further operable to selectively open said isolation valve to selectively increase pressure to the wheel brake after said wheel lock-up condition has been corrected and the rate of change of decelertion of the associated wheel increases by a predetermined amount, said control means operable to selectively control the application of increased pressure to the associated wheel brake to prevent further lock-up of he associated wheel.

30. The brake control system according to claim 29 wherein said control means includes means for generating a slip signal when said wheel lock-up condition is detected, and means responsive to said slip signal for closing said isolation valve means.

31. The brake control system according to claim 30 wherein said control means includes means coupled to monitor the speed of the associated wheel for generating a wheel speed signal, means responsive to said wheel speed signal for generating a speed ramp signal representing the speed the vehicle would travel if decelerated at a first predetermined rate, and means for generating said slip signal when the difference between said speed ramp signal and said wheel speed signal exceeds a predetermined slip threshold.

32. The brake control system according to claim 31 wherein said speed ramp signal is a first speed ramp signal and said slip signal is a first slip signal, and wherein said control means includes means responsive to said wheel speed signal for generating a second speed ramp signal representing the speed the vehicle would travel if decelerated at a second predetermined rate, means for generating a second slip signal when the difference between said second speed ramp signal and said wheel speed signal exceeds said predetermined slip threshold, and means responsive to said second slip signal for selectively opening said dump value means.

33. The brake control system according to claim 32 wherein said second predetermined rate is greater than said first predetermined rate.

34. The brake control system according to claim 32 wherein said control means includes means for increasing said slip threshold for a predetermined time period when wheel speed oscillations are detected.

35. The brake control system according to claim 31 wherein said control means includes means for generating a large slip signal when the difference between said speed ramp signal and said wheel speed signal is greater than said slip threshold by a predetermined amount, and means responsive to said large slip signal when the associated wheel is not accelerating for opening said dump valve means to reduce pressure to the selected wheel brake.

36. The brake control system according to claim 30 wherein said predetermined amount is a first predetermined amount and wherein said control means includes means responsive to said slip signal when the associated wheel deceleration exceeds a second predetermined amount for generating a dump signal to open said dump valve means to selectively reduce pressure to the selected wheel brake.

37. The brake control system according to claim 36 wherein said dump signal includes a series of dump pulses each having a width representing the time the dump valve means remains open.

38. The brake control system according to claim 37 including means for varying the width of said dump pulses.

39. The brake control system according to claim 37 including means for varying the spacing between successive dump pulses.

40. The brake control system according to claim 29 wherein said isolation valve means includes an inlet coupled to the supply means and an outlet coupled to the selected wheel brake, said control means including means for monitoring the differential pressure across said isolation valve means and for generating a pressure differential signal when said isolation valve means is closed and the pressure at said outlet is greater than the pressure at said inlet, said control means responsive to said pressure differential signal for opening said isolation valve means.

41. The brake control system according to claim 29 wherein said fluid reservoir is contained in the master cylinder.

42. The brake control system according to claim 29 wherein said fluid reservoir is a fluid accoumulator which includes means for maintaining fluid stored therein at a predetermined elevated pressure relative to a non-actuated fluid pressure supplied to the selected wheel brake.

43. A method of braking at least one wheel of a multi-wheeled vehicle having means for supplying pressurized brake fluid to actuate a selected wheel brake, said method comprising the steps of:
(a) supplying brake fluid at an increasing pressure to actuate the selected wheel brake and decelerate the associated wheel;
(b) holding fluid pressure to the selected wheel brake at a relatively constant level after a wheel lock-up condition of the associated wheel is detected;
(c) subseqent to step (b), selectively reducing fluid pressure to the selected wheel brake to correct the wheel lock-up condition; and
(d) subseqent to step (c), selectively increasing fluid pressure to the selected wheel brake when the rate of change of deceleration of the associated wheel increases by a first predetermined amount.

44. The method according to claim 43 wherein step (b) includes the steps of:
(b1) generating a wheel speed signal representing the speed of the associated wheel;
(b2) generating a speed ramp signal representing the speed the vehicle would travel if decelerated at a first predetermined rate;
(b3) generating a slip signal when the difference between the speed ramp signal and the wheel speed signal is greater than a predetermined slip threshold; and
(b4) holding the fluid pressure to the wheel brake at a relatively constant level in response to the slip signal.

45. The method according to claim 44 wherein step (c) includes the steps of:
(c1) generating a wheel deceleration signal representing the deceleration of the associated wheel;
(c2) generating a dump signal in response to the slip signal when the wheel deceleration signal exceeds a second predetermined amount; and
(c3) reducing the fluid pressure to the selected wheel brake in response to the dump signal.

46. The method according to claim 44 including, subsequent to step (b), the steps of:
(d1) generating a no slip signal when the difference between the speed ramp signal and the wheel speed signal is less than the predetermined slip threshold;
(d2) generating an apply signal in response to the no slip signal when the rate of increase in wheel deceleration exceeds said first predetermined amount; and
(d3) selectively increasing fluid pressure to the wheel brake in response to the apply signal.

47. The method according to claim 43 including the steps of:
monitoring the differential pressure between the supply pressure from the supply means and the controlled pressure to the selected wheel brake; and reducing the controlled pressure to a level substantially equal to the supply pressure when the controlled pressure is greater than the supply pressure.

48. In a wheeled vehicle having means for supplying pressurized brake fluid to actuate the associated wheel brakes of the vehicle, a brake control system for controlling the application of pressurized brake fluid to at least one selected wheel brake to control the braking of the associated wheel, said control system comprising:

a normally open isolation valve means connected between the supply means and the selected wheel brake;

a normally closed dump valve means connected between the selected wheel brake and a fluid reservoir; and control means connected to operate said isolation valve means and said dump valve means, means coupled to monitor the speed of the associated wheel for generating a wheel speed signal, means for generating a first slip signal when the difference between the wheel speed signal and a first speed ramp signal representing a first predetermined deceleration rate exceeds a predetermined slip threshold, means responsive to said first slip signal for closing said isolation valve, means for generating a second slip signal when the difference between the wheel speed signal and a second speed ramp signal representing a second predetermined deceleration rate greater than said first predetermined rate exceeds said predetermined slip threshold, and means responsive to said second slip signal for selectively opening said dump valve means after said isolation valve has been closed to enable fluid to flow into said fluid reservoir to selectively reduce fluid pressure to the selected wheel brake.

49. A brake control system for a wheeled vehicle having first and second sets of wheels provided with first and second sets of wheel brakes, a brake pedal operator, a master cylinder connected with and actuated by the brake pedal to supply pressurized brake fluid in a first brake pressurizing circuit to actuate the first set of wheel brakes and to supply pressurized brake fluid in a second brake pressurizing circuit to actuate the second set of wheel brakes, said second brake pressurizing circuit comprising:

a normally open isolation valve means connected between the master cylinder and the second set of wheel brakes;

a normally closed dump valve means connected between the second set of wheel brakes and a fluid reservoir; and control means connected to operate said isolation. valve means and said dump valve means, means coupled to monitor the speed of the associated wheel for generating a wheel speed signal, means for generating a first slip signal when the difference between the wheel speed signal and a first speed ramp signal representing a first predetermnied deceleration rate exceeds a predetermined slip threshold, means responsive to said first slip signal for closing said isolation valve, means for generating a second slip signal when the difference between the wheel speed signal and a second speed ramp signal representing a second predetermined deceleration rate greater than said first predetermined rate exceeds said predetermined slip threshold, and means responsive to said second slip signal for selectively opening said dump valve means after said isolation valve has been closed to enable fluid to flow into said fluid reservoir to selectively reduce fluid pressure to the second set of wheel brakes.

50. A method of braking at least one wheel of a multi-wheeled vehicle having means for supplying pressurized brake fluid to actuate a selected wheel brake, said method comprising the steps of:

(a) supplying brake fluid at an increasing pressure to actuate the selected wheel brake and decelerate the associated wheel;

(b) monitoring the speed of he associated wheel;

(c) compairing the speed of the associated wheel with a first speed ramp signal representing a first predetermined deceleration rate;

(d) holding pressure to the selected wheel brake at a relatively constant level after the difference between the associated wheel speed and the first speed ramp exceeds a predetermined slip threshold;

(e) subsequent to step (d), comparing the speed of the associated wheel with a second speed ramp signal representing a second predetermined deceleration rate; and (f) selectively reducing pressure to the selected wheel brake when the difference between the associated wheel speed and the second speed ramp exceeds said predetermined slip threshold.

* * * * *